(12) United States Patent
Ryu

(10) Patent No.: US 12,436,573 B2
(45) Date of Patent: Oct. 7, 2025

(54) METHOD OF MANUFACTURING DISPLAY DEVICE

(71) Applicant: SAMSUNG DISPLAY CO., LTD., Yongin-si (KR)

(72) Inventor: Suchang Ryu, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 482 days.

(21) Appl. No.: 18/069,402

(22) Filed: Dec. 21, 2022

(65) Prior Publication Data

US 2023/0350463 A1    Nov. 2, 2023

(30) Foreign Application Priority Data

Apr. 27, 2022   (KR) .......................... 10-2022-0052006

(51) Int. Cl.
*G06F 1/16*     (2006.01)
*H05K 5/00*     (2025.01)
*H05K 7/00*     (2006.01)

(52) U.S. Cl.
CPC .......... *G06F 1/1656* (2013.01); *G06F 1/1616* (2013.01)

(58) Field of Classification Search
CPC ... G06F 1/1656; G06F 1/1616; H10K 77/111; H10K 77/10; H10K 71/421; H10K 71/231; H10K 71/50; H10K 59/12; C03C 15/00; G03F 7/40; G03F 1/48
See application file for complete search history.

(56) References Cited

U.S. PATENT DOCUMENTS

| | | | | |
|---|---|---|---|---|
| 8,409,771 B2* | 4/2013 | Ku | ............................ | G03F 1/48 |
| | | | | 430/5 |
| 10,459,271 B2* | 10/2019 | Guo | .......................... | G03F 7/40 |
| 11,101,454 B2* | 8/2021 | Jung | ..................... | H10K 71/421 |
| 12,179,464 B2* | 12/2024 | Seo | ......................... | H10K 59/12 |
| 2007/0158656 A1* | 7/2007 | Lee | .................... | G02F 1/133305 |
| | | | | 438/149 |
| 2012/0135195 A1* | 5/2012 | Glaesemann | ...... | B23K 26/0624 |
| | | | | 428/156 |
| 2013/0303053 A1* | 11/2013 | Mase | ........................ | B24C 1/04 |
| | | | | 451/31 |
| 2014/0132856 A1* | 5/2014 | Hung | ...................... | C03C 25/10 |
| | | | | 428/161 |
| 2017/0084883 A1* | 3/2017 | Kwon | .................. | H10K 50/844 |
| 2017/0326682 A1 | 11/2017 | Park | | |
| 2020/0168849 A1* | 5/2020 | Jung | ..................... | H10K 71/421 |

(Continued)

FOREIGN PATENT DOCUMENTS

EP        3805896 A1    4/2021
JP      2016058474 A    4/2016

(Continued)

*Primary Examiner* — Anthony M Haughton
(74) *Attorney, Agent, or Firm* — CANTOR COLBURN LLP

(57) ABSTRACT

A method of manufacturing a display device includes defining an etching line having a shape of a closed curve on a metal plate having a rigidity higher than a rigidity of a display panel, etching the metal plate along the etching line, laminating the etched metal plate to a display module including the display panel, defining a cutting line corresponding to the etching line, and cutting the display module and the metal plate laminated to the display module together with each other along the cutting line.

20 Claims, 22 Drawing Sheets

(56) References Cited

U.S. PATENT DOCUMENTS

| | | |
|---|---|---|
| 2020/0301474 A1 | 9/2020 | Yug |
| 2020/0381662 A1 | 12/2020 | Andou |
| 2021/0104694 A1 | 4/2021 | Yee |
| 2021/0399257 A1 | 12/2021 | Hwang et al. |
| 2022/0246894 A1* | 8/2022 | Han ................ H10K 77/111 |
| 2022/0402235 A1* | 12/2022 | Seo .................... C03C 15/00 |
| 2023/0350463 A1* | 11/2023 | Ryu .................. G06F 1/1656 |

FOREIGN PATENT DOCUMENTS

| | | |
|---|---|---|
| JP | 2019121548 A | 7/2019 |
| KR | 1020170084402 A | 7/2017 |
| KR | 1020200051898 A | 5/2020 |
| KR | 1020200113073 A | 10/2020 |

\* cited by examiner

METHOD OF MANUFACTURING DISPLAY DEVICE

This application claims priority to Korean Patent Application No. 10-2022-0052006, filed on Apr. 27, 2022, and all the benefits accruing therefrom under 35 U.S.C. § 119, the content of which in its entirety is herein incorporated by reference.

BACKGROUND

1. Field

Embodiments of the disclosure relate to a method of manufacturing a display device. More particularly, embodiments of the disclosure relate to a method of manufacturing a display device including a metal plate.

2. Description of the Related Art

As display devices are used as mobile devices, the display device tends to become smaller. As the display device becomes smaller, a ratio of a bezel area to a front surface of the display device is emerging as one of important factors in designing the display device.

SUMMARY

An feature of the disclosure is to provide a method of manufacturing a display device.

However, features of the disclosure are not limited by the above-described features, and may be variously expanded without departing from the idea and scope of the disclosure.

In order to achieve the above feature of the disclosure, according embodiments of the disclosure, a method of manufacturing a display device includes defining an etching line having a shape of a closed curve on a metal plate having a rigidity higher than a rigidity of a display panel, etching the metal plate along the etching line, laminating the etched metal plate to a display module including the display panel, defining a cutting line corresponding to the etching line, and cutting the display module and the metal plate laminated to the display module together with each other along the cutting line.

In an embodiment, the metal plate may be etched by at least half of a thickness of the metal plate.

In an embodiment, the metal plate may include a folding part and a non-folding part that is adjacent to the folding part, and a first depth by which the folding part is etched may be greater than a second depth by which the non-folding part is etched.

In an embodiment, the closed curve may include a rectangle having a rounded vertex.

In an embodiment, the cutting line may have a shape congruent with the closed curve.

In an embodiment, a first edge part, which is an edge part of the cut display module, and a second edge part, which is an edge part of the cut metal plate, may be aligned to match each other in a plan view.

In an embodiment, for all of virtual planes that are perpendicular to a plane defined by the plan view, a shortest distance from a virtual plane of the virtual planes to the first edge part and a shortest distance from the virtual plane to the second edge part may be equal to each other.

In an embodiment, when the display module and the metal plate laminated to the display module are cut together with each other along the cutting line, a planar area size of the display module and a planar area size of the metal plate may be equal to each other.

In an embodiment, the metal plate may include stainless steel.

In an embodiment, the method may further include accommodating each of the cut display module and the cut metal plate.

In order to achieve the above feature of the disclosure, according embodiments of the disclosure, a method of manufacturing a display device includes defining an etching line having a shape of a closed curve on a metal plate having a rigidity higher than a rigidity of a display panel, etching the metal plate along the etching line, laminating the etched metal plate to a display module including the display panel, defining a first cutting line corresponding to the etching line and a second cutting line that is different from the first cutting line on one surface of the metal plate, and cutting only the laminated metal plate among the display module and the metal plate laminated to the display module along the first cutting line.

In an embodiment, the metal plate may be etched by at least half of a thickness of the metal plate.

In an embodiment, the metal plate may include a folding part and a non-folding part that is adjacent to the folding part, and a first depth by which the folding part is etched may be greater than a second depth by which the non-folding part is etched.

In an embodiment, the closed curve may include a rectangle having a rounded vertex.

In an embodiment, the first cutting line may have a shape congruent with the closed curve.

In an embodiment, the second cutting line may have a shape resembling the closed curve.

In an embodiment, before the cutting only the laminated metal plate, the method may further include cutting only the display module among the display module and the metal plate laminated to the display module along the second cutting line.

In an embodiment, after the cutting only the laminated metal plate, the method may further include cutting only the display module among the display module and the metal plate laminated to the display module along the second cutting line.

In an embodiment, a first edge part, which is an edge part of the cut display module, and a second edge part, which is an edge part of the cut metal plate, may be aligned to match each other in a plan view.

In an embodiment, for all of virtual planes that are perpendicular to a plane defined by the plan view, a shortest distance from the virtual plane of the all of virtual planes to the first edge part and a shortest distance from the virtual plane to the second edge part may be equal to each other.

According to the method of manufacturing the display device of an embodiment of the disclosure, the display module and the metal plate laminated to the display module may be cut together with each other along the cutting line, so that a laminating tolerance of the display module may be reduced, and a laminating tolerance between the display module and the metal plate may also be reduced. Therefore, a design for reducing a ratio of a bezel area to a front surface of the display device may be facilitated.

However, effects of the disclosure are not limited to the above-described effects, and may be variously expanded without departing from the idea and scope of the disclosure.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION OF THE EMBODIMENTS

Figure 1:
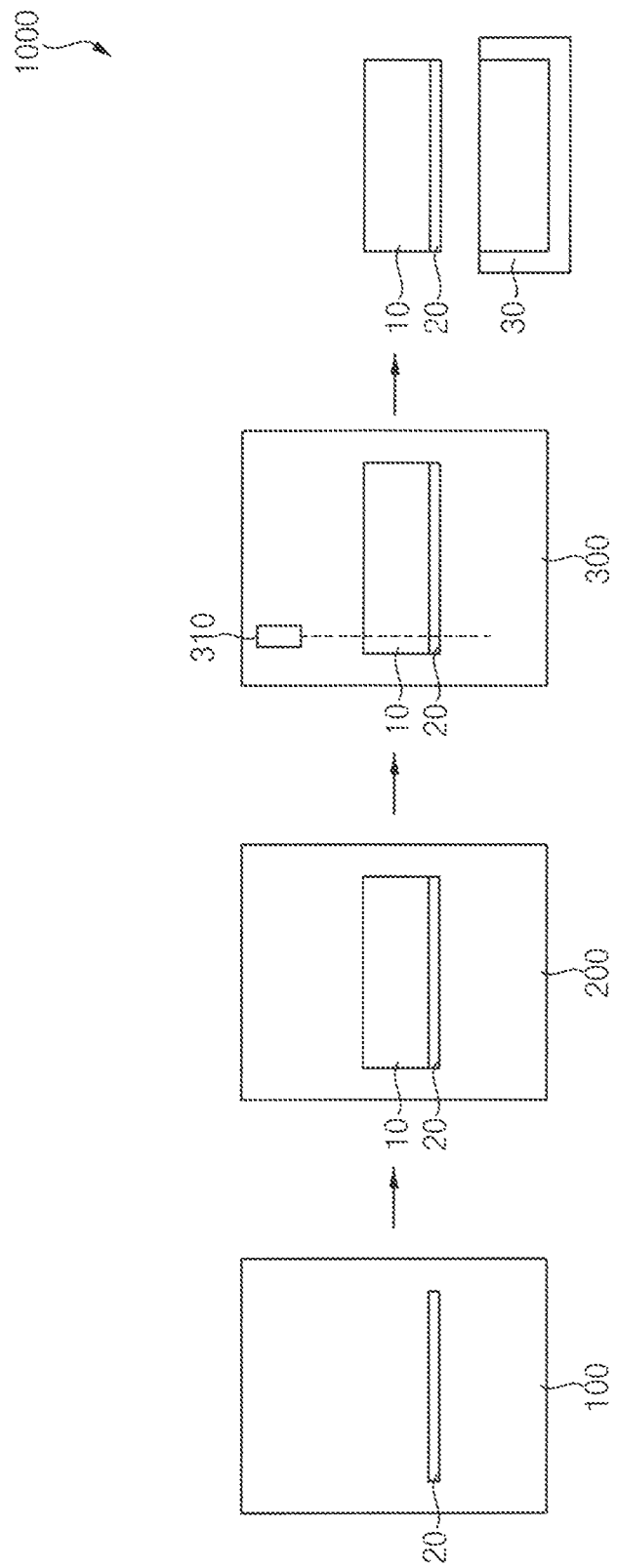
FIG. 1 is a view showing an embodiment of a manufacturing apparatus for a display device according to the disclosure.

Hereinafter, a method of manufacturing a display device and a manufacturing apparatus for the display device in embodiments of the disclosure will be described in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within +30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Figure 2:
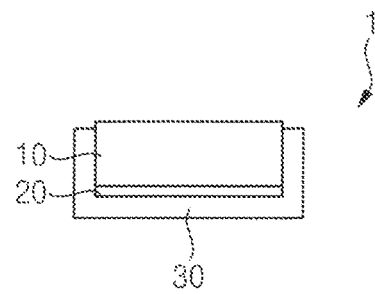
FIG. 2 is a cross-sectional view showing an embodiment of a display device manufactured by the manufacturing apparatus of FIG. 1.

FIG. 1 is a view showing an embodiment of a manufacturing apparatus for a display device according to the disclosure, and FIG. 2 is a cross-sectional view showing an embodiment of a display device manufactured by the manufacturing apparatus of FIG. 1.

Referring to FIGS. 1 and 2, in an embodiment of the disclosure, a manufacturing apparatus 1000 for a display device 1 may include an etcher 100, a laminator 200, and a cutter 300. Each of the etcher 100, the laminator 200, and the cutter 300 will be described in detail below.

Figure 3:
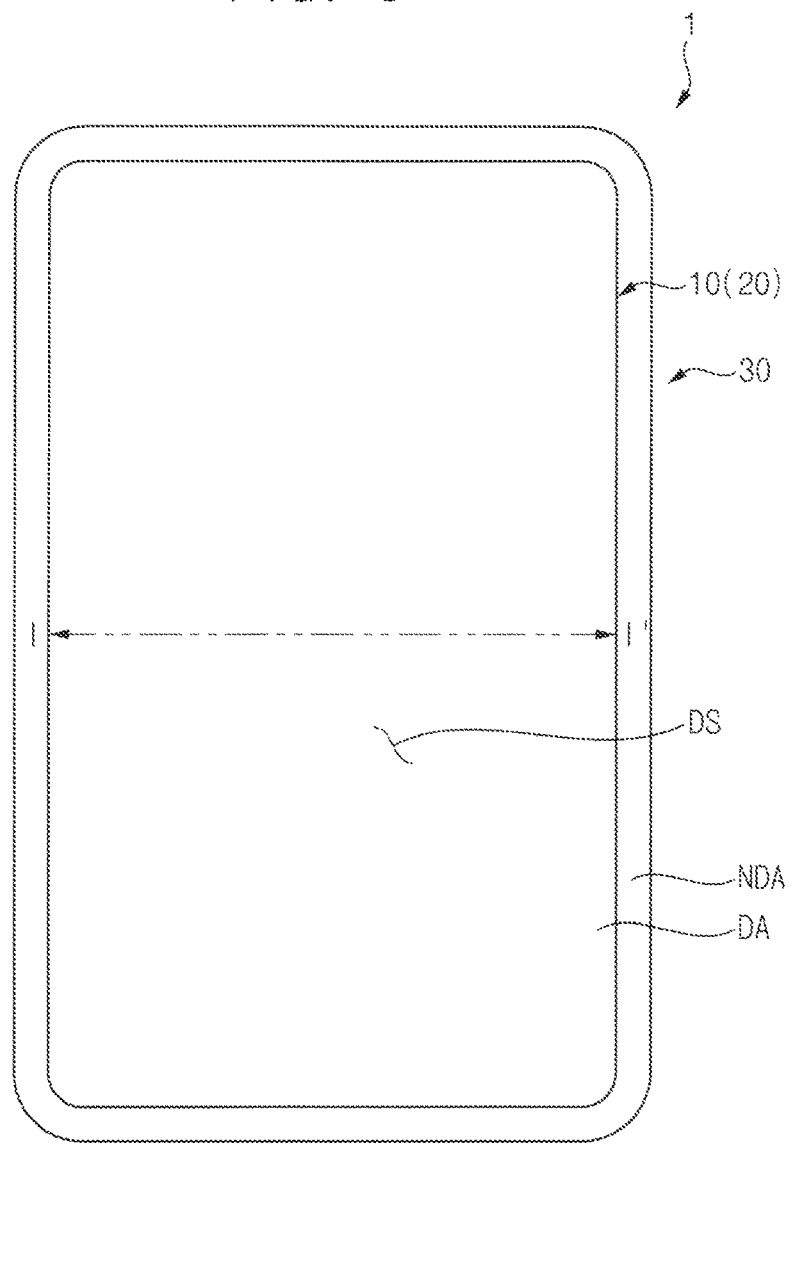
FIG. 3 is a plan view showing the display device of FIG. 2.

FIG. 3 is a plan view showing the display device of FIG. 2.

Referring to FIGS. 2 and 3, in an embodiment, the display device 1 may have a quadrangular (e.g., rectangular) shape in a plan view. In an embodiment, the display device 1 may include opposite side surfaces extending in a first direction D1, and opposite side surfaces extending in a second direction D2 that is perpendicular to the first direction D1, for example. However, the shape of the display device 1 is not limited thereto, and the display device 1 may have various shapes.

The display device 1 may include a display surface DS. The display device 1 may display an image through the display surface DS. In an embodiment, the display surface DS may be a front surface of the display device 1. In another embodiment, the display surface DS may be a rear surface of the display device 1.

The display device 1 may include a display area DA and a non-display area NDA. The display area DA may display an image. A plurality of pixels maybe disposed in the display area DA.

The non-display area NDA may be disposed at a periphery of the display area DA. The non-display area NDA may surround at least a portion of the display area DA. The non-display area NDA may not display an image. A black matrix may be disposed in the non-display area NDA.

In an embodiment, the display device 1 may be a foldable display device. In an embodiment, the display device 1 may be folded or unfolded, for example.

Figure 4:
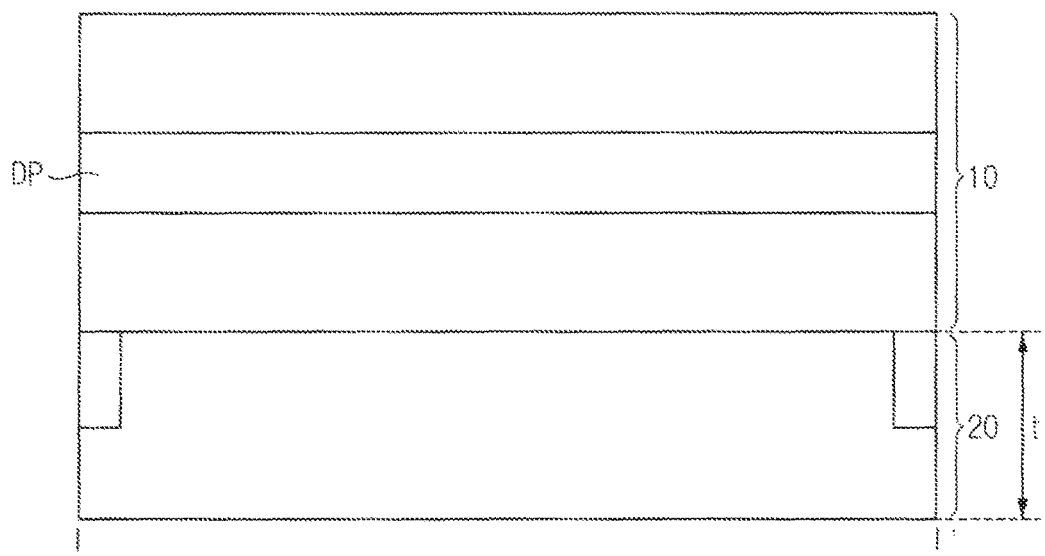
FIG. 4 is a cross-sectional view taken along line I-I' of FIG. 3.
Figure 4:
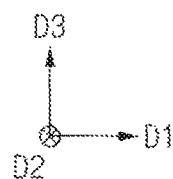

FIG. 4 is a cross-sectional view taken along line I-I' of FIG. 3.

Referring to FIGS. 1 to 4, the display device 1 may include a display module 10 including a display panel DP, a metal plate 20 having a rigidity greater than a rigidity the display panel DP, and a case 30 for accommodating each of the display module 10 and the metal plate 20. However, it will be noted that FIG. 4 only shows the manufactured display device 1. In an embodiment, since FIG. 4 shows the manufactured display device 1, the display module 10 shown in FIG. 4 may be a display module cut along a cutting line (e.g., a cutting line CL of FIG. 12), and the metal plate 20 shown in FIG. 4 may be a metal plate cut along the cutting line, for example.

Figure 5:
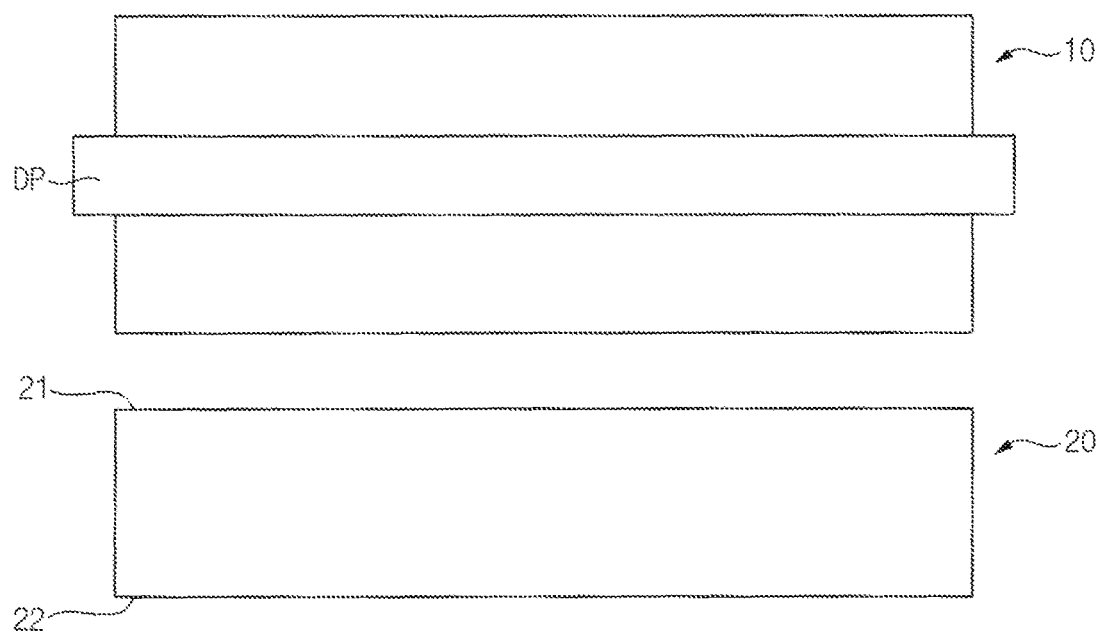
FIG. 5 is a cross-sectional view showing a display module and a metal plate desired for manufacturing the display device of FIG. 2.

FIG. 5 is a cross-sectional view showing a display module and a metal plate desired for manufacturing the display device of FIG. 2.

Referring to FIGS. 2 and 5, the display module 10 may include the display panel DP. The display module 10 shown in FIG. 5 may be a display module before being cut along the cutting line (e.g., the cutting line CL of FIG. 12).

The metal plate 20 may have greater rigidity than the display panel DP. In other words, an intensity of a laser for cutting the metal plate 20 may be greater than an intensity of a laser for cutting the display panel DP.

The metal plate 20 may include stainless steel. The stainless steel may include at least one of iron, chromium, carbon, nickel, silicon, manganese, and molybdenum, and an alloy thereof. In an embodiment, the metal plate 20 may include austenite-based stainless steel.

Figure 6:
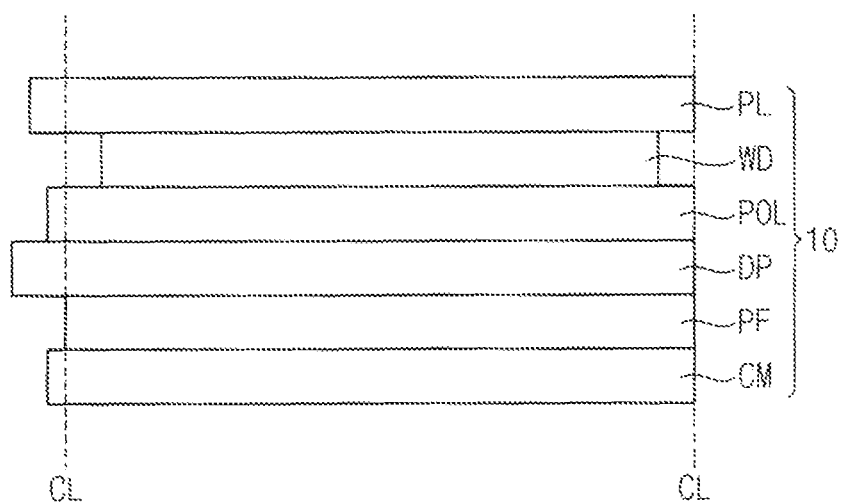
FIG. 6 is a cross-sectional view for describing the display module of FIG. 5.

FIG. 6 is a view for describing the display module of FIG. 5.

Referring to FIGS. 5 and 6, the display module 10 may include a cushioning member CM, a protective film PF, a display panel DP, a polarizing layer POL, a window WD, and a protective layer PL.

The display panel DP may display an image. The display panel DP may include an organic light-emitting display panel, an inorganic light-emitting display panel, a quantum dot light-emitting display panel, a micro-light-emitting diode ("micro-LED") display panel, a nano-LED display panel, a plasma display panel, a field emission display panel, a cathode ray tube display panel, a liquid crystal display panel, an electrophoretic display panel, or the like.

The polarizing layer POL may be disposed on the display panel DP. The polarizing layer POL may polarize a light passing through the polarizing layer POL. The polarizing layer POL may reduce external light reflection of the display device 1. In an embodiment, the polarizing layer POL may include a polyvinyl alcohol film. The polarizing layer POL may be stretched in one direction. A stretching direction of the polarizing layer POL may be an absorption axis, and a direction that is perpendicular to the stretching direction may be a transmission axis.

The window WD may be disposed on the polarizing layer POL. The window WD may protect the display panel DP. The window WD may include a transparent material. In an embodiment, the window WD may include glass, plastic, or the like.

When the window WD includes glass, the glass may be ultra-thin glass ("UTG"). When the glass is the ultra-thin glass, the glass may be flexible. In an embodiment, a thickness of the glass may be about 10 micrometers (μm) to about 300 μm, for example.

The protective layer PL may be disposed on the window WD. The protective layer PL may perform at least one of functions of preventing scattering of the window WD, absorbing an impact on the window WD, preventing denting of the window WD, preventing a fingerprint on the window WD, and preventing glare of the window WD. The protective layer PL may include a transparent polymer film. In an embodiment, an embodiment of the transparent polymer film constituting the protective layer PL may include polyethylene terephthalate ("PET"), polyethylene naphthalate ("PEN"), polyethersulfone ("PES"), polyimide ("PI"), polyarylate ("PAR"), polycarbonate ("PC"), polymethyl methacrylate ("PMMA"), cycloolefin polymer ("COP"), or the like.

The protective film PF may be disposed under the display panel DP. The protective film PF may reduce stress applied to the display panel DP when the display panel DP is folded or bent. In addition, the protective film PF may prevent moisture or the like from penetrating into the display panel DP, and may absorb an external impact.

The protective film PF may be a plastic film. In an embodiment, an embodiment of the plastic film constituting the protective film PF may include PI, PET, PC, polypropylene ("PP"), PES, PMMA, triacetyl cellulose ("TAC"), COP, or the like.

The cushioning member CM may be disposed under the protective film PF. The cushioning member CM may protect the display panel DP by cushioning an external impact that may be applied to the display panel DP. To this end, the cushioning member CM may include a material including air to perform cushioning, such as a cushion or a sponge. In addition, in order to facilitate folding and unfolding of the display panel DP, the cushioning member CM may include a material having flexibility. In an embodiment, an embodiment of the material constituting the cushioning member CM may include an acryl-based resin (polyacrylate resin), polyurethane, thermoplastic polyurethane ("TPU"), latex, polyurethane foam, polystyrene foam, or the like, for example.

FIGS. 7 to 16 are views for describing a method of manufacturing the display device of FIG. 2.

Figure 7:
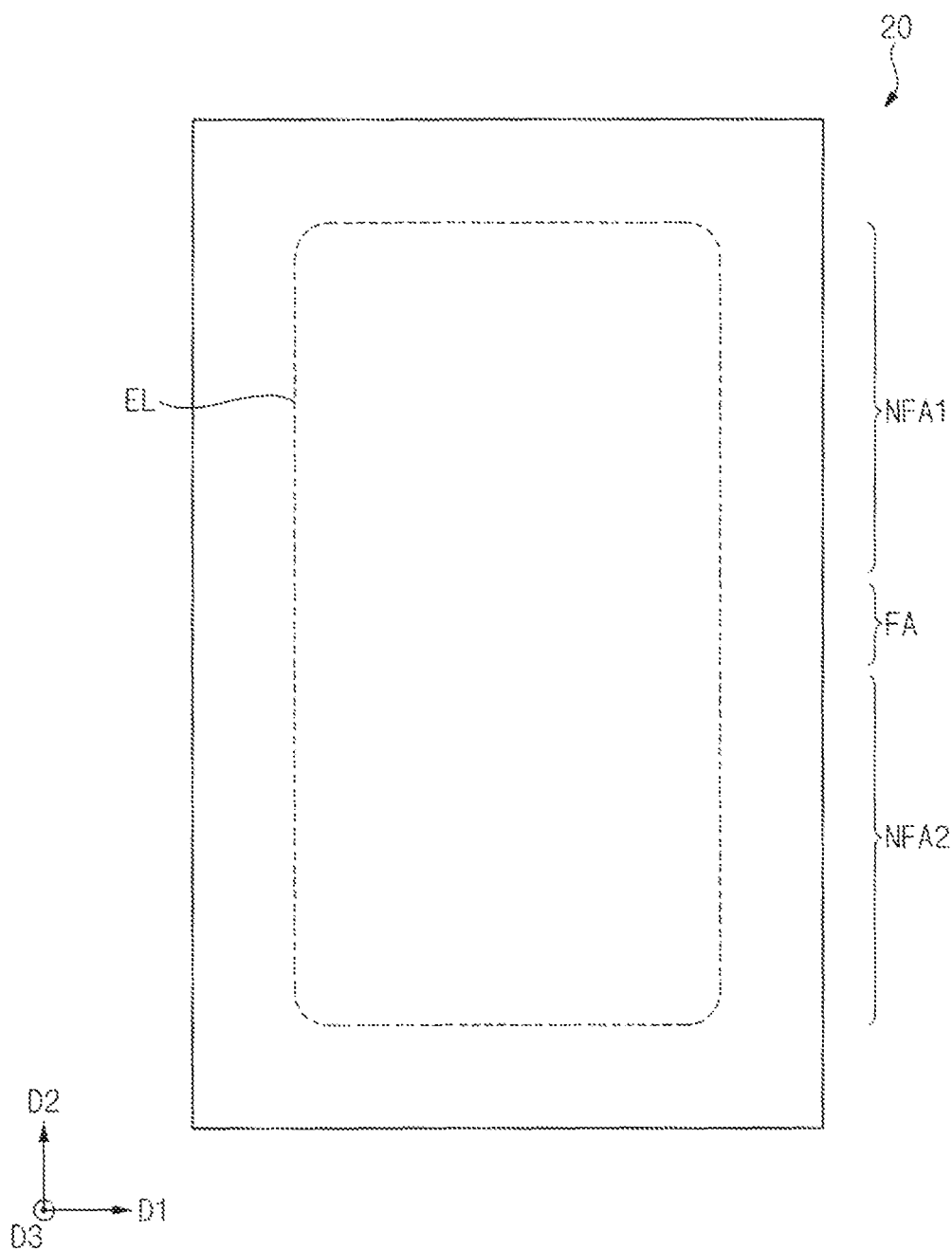
FIGS. 7 to 16 are views for describing a method of manufacturing the display device of FIG. 2.
Figure 8:
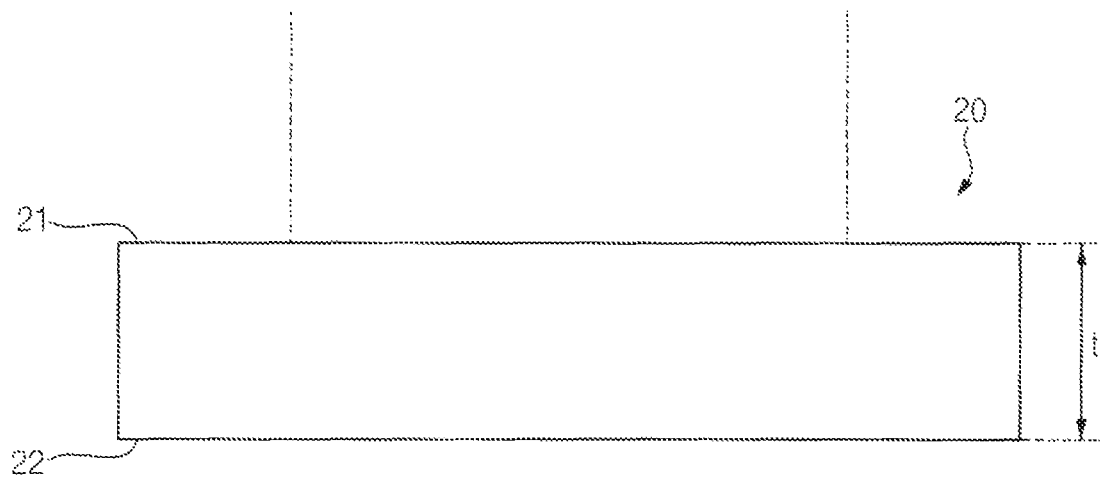
Figure 8:
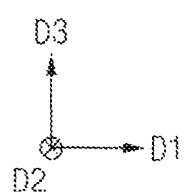

Referring to FIGS. 1, 7, and 8, FIG. 7 is a plan view showing the metal plate of FIG. 5, and FIG. 8 is a cross-sectional view showing the metal plate of FIG. 7, for example.

The etcher 100 may define an etching line EL. In an embodiment, the etcher 100 may include a mask (not shown) and an etchant sprayer (not shown), and may define the etching line EL through the mask (not shown), for example.

A position in which the etching line EL is defined may be on one surface 21 of the metal plate 20. However, the disclosure is not limited thereto. In an embodiment, the position in which the etching line EL is defined may be on an opposite surface 22 of the metal plate 20, for example. The one surface 21 of the metal plate 20 may be a surface extending in each of the first direction D1 and the second direction D2 that is perpendicular to the first direction D1, and the opposite surface 22 of the metal plate 20 may be a surface that is opposite to the one surface 21.

The etching line EL may have a shape of a closed curve.

In an embodiment, the closed curve of the etching line EL may be a rectangle having a rounded vertex. However, the disclosure is not limited thereto. In an embodiment, the closed curve may be a circle, for example.

In this case, it will be noted that FIG. 8 shows a state before the metal plate 20 is etched. In this case, the metal plate 20 may have a thickness t.

In an embodiment, the thickness t of the metal plate 20 may be about 0.1 millimeter (mm) to about 0.2 mm.

Figure 9:
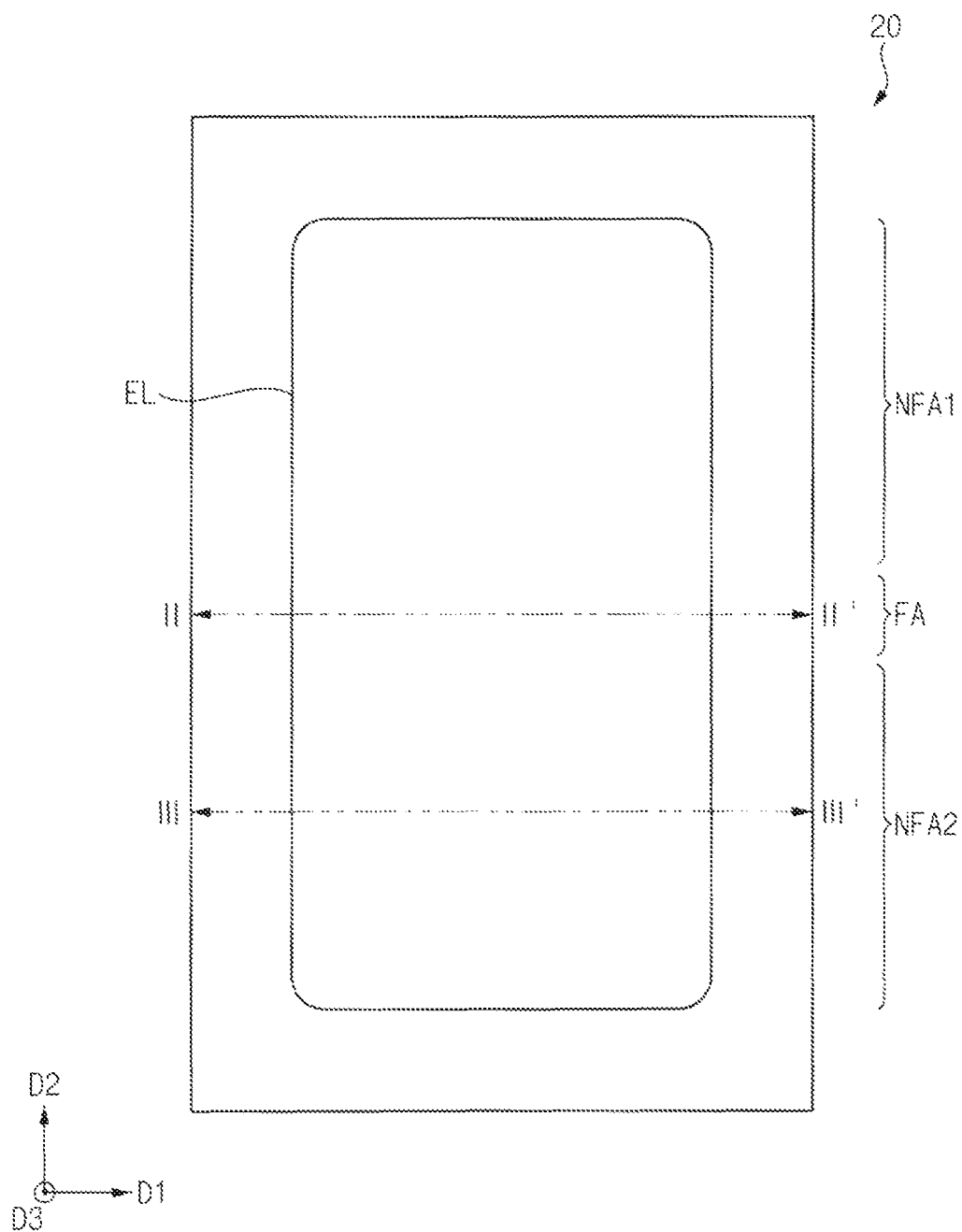
Figure 10:
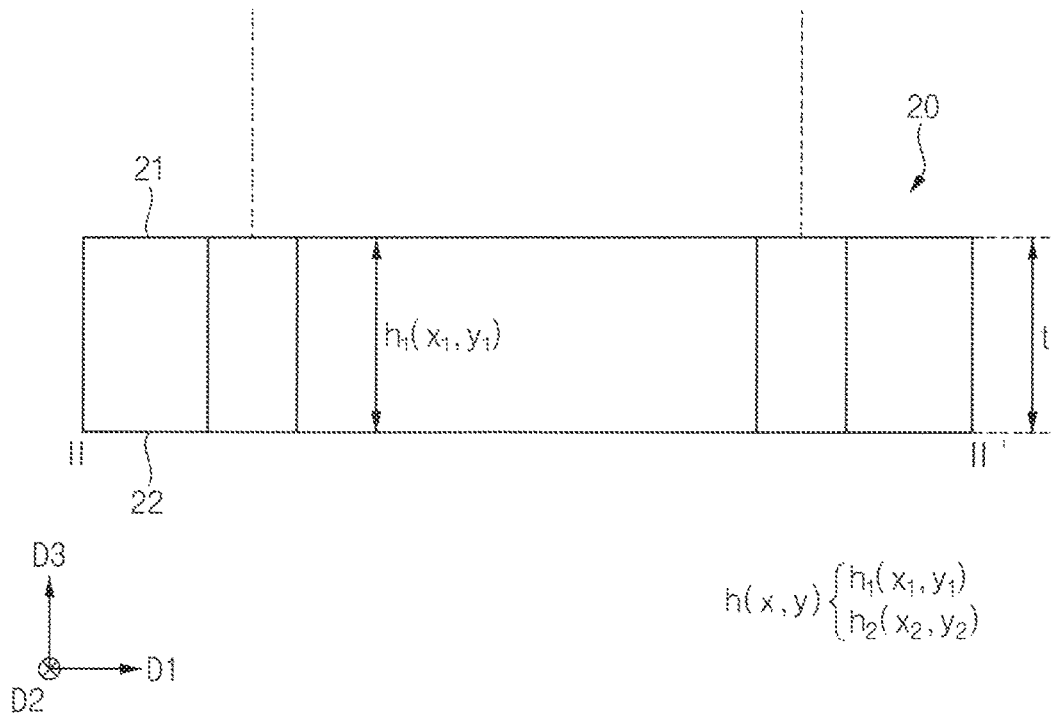
Figure 11:
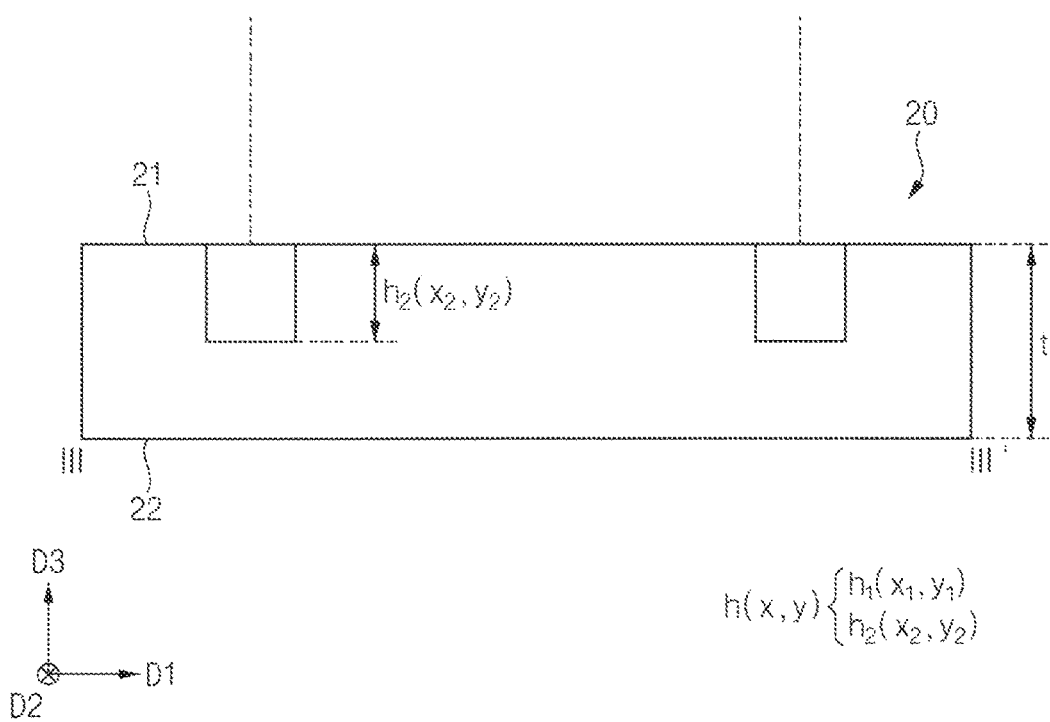

Referring to FIGS. 1 and 9 to 11, FIG. 9 is a plan view showing a state in which etching is performed along an etching line defined on the metal plate of FIG. 7, FIG. 10 is a cross-sectional view taken along line II-II' of FIG. 9, and FIG. 11 is a cross-sectional view taken along line III-III' of FIG. 9, for example.

The etcher 100 may etch the metal plate 20 along the etching line EL. In an embodiment, the etcher 100 may etch along the etching line EL, for example. In other words, since the etching line EL has the shape of the closed curve, the metal plate 20 may be etched in the shape of the closed curve.

For all points (x, y) of the etching line EL, depths h(x, y) by which the etching is performed along the etching line EL may be at least half of the thickness t of the metal plate 20 before the etching. In this case, each of the depths h(x, y) by which the etching is performed along the etching line EL may be a function of x, which is a position in the first direction D1, and y, which is a position in the second direction D2. The depths h(x, y) and the thickness t may satisfy Mathematical formula 1 below.

$$h(x, y) \geq \frac{1}{2}t \qquad \text{<Mathematical formula 1>}$$

As described above, for all the points (x, y) of the etching line EL, the depths h(x, y) by which the etching is performed along the etching line EL may be at least half of the thickness t of the metal plate 20 before the etching. In other words, the metal plate 20 may be etched by at least half of the thickness t of the metal plate 20 before the etching. Accordingly, the metal plate 20 corresponding to the etching line EL may be easily cut along the cutting line (e.g., the cutting line CL of FIG. 12).

In an embodiment, the metal plate 20 may include a folding part FA and non-folding parts NFA1 and NFA2 that are adjacent to the folding part FA, and each of first depths $h_1(x_1, y_1)$ by which the etching is performed at all points $(x_1, y_1)$ where the etching line EL is common to the folding part FA may be greater than each of second depths $h_2(x_2, y_2)$ by which the etching is performed at all points $(x_2, y_2)$ where the etching line EL is common to the non-folding parts NFA1 and NFA2. In this case, the depths h(x, y) by which the etching is performed along the etching line EL may include the first depths $h_1(x_1, y_1)$ and the second depths $h_2(x_2, y_2)$. Each of the first depths $h_1(x_1, y_1)$ may be a function of $x_1$, which is a position in the first direction D1, and $y_1$, which is a position in the second direction D2, and each of the second depths $h_2(x_2, y_2)$ may be a function of $x_2$, which is a position in the first direction D1, and $y_2$, which is a position in the second direction D2. The first depths $h_1(x_1, y_1)$ and the second depths $h_2(x_2, y_2)$ may satisfy Mathematical formula 2 below.

$$h_1(x_1,y_1) > h_2(x_2,y_2) \qquad \text{<Mathematical formula 2>}$$

As described above, in an embodiment, each of the first depths $h_1(x_1, y_1)$ may be greater than each of the second depths $h_2(x_2, y_2)$. In other words, the metal plate 20 may be etched deeper in the folding part FA than in the non-folding parts NFA1 and NFA2. That is, a first depth (e.g., the first depths $h_1(x_1, y_1)$) by which the folding part FA is etched may be greater than a second depth (e.g., the second depths $h_2(x_2, y_2)$) by which the non-folding parts NFA1 and NFA2 are etched. Accordingly, the display device 1 may be easily folded.

In an embodiment, each of the first depths $h_1(x_1, y_1)$ may be equal to the thickness t of the metal plate 20 before the etching. In other words, at all the points $(x_1, y_1)$ where the etching line EL is common to the folding part FA, the metal plate 20 may be penetrated by the etching. Accordingly, deformation occurring in the display module 10 and the metal plate 20 in a cutting process may be reduced. The first depths $h_1(x_1, y_1)$ and the thickness t may satisfy Mathematical formula 3 below.

$$h_1(x_1,y_1)=t \qquad \text{<Mathematical formula 3>}$$

Figure 12:
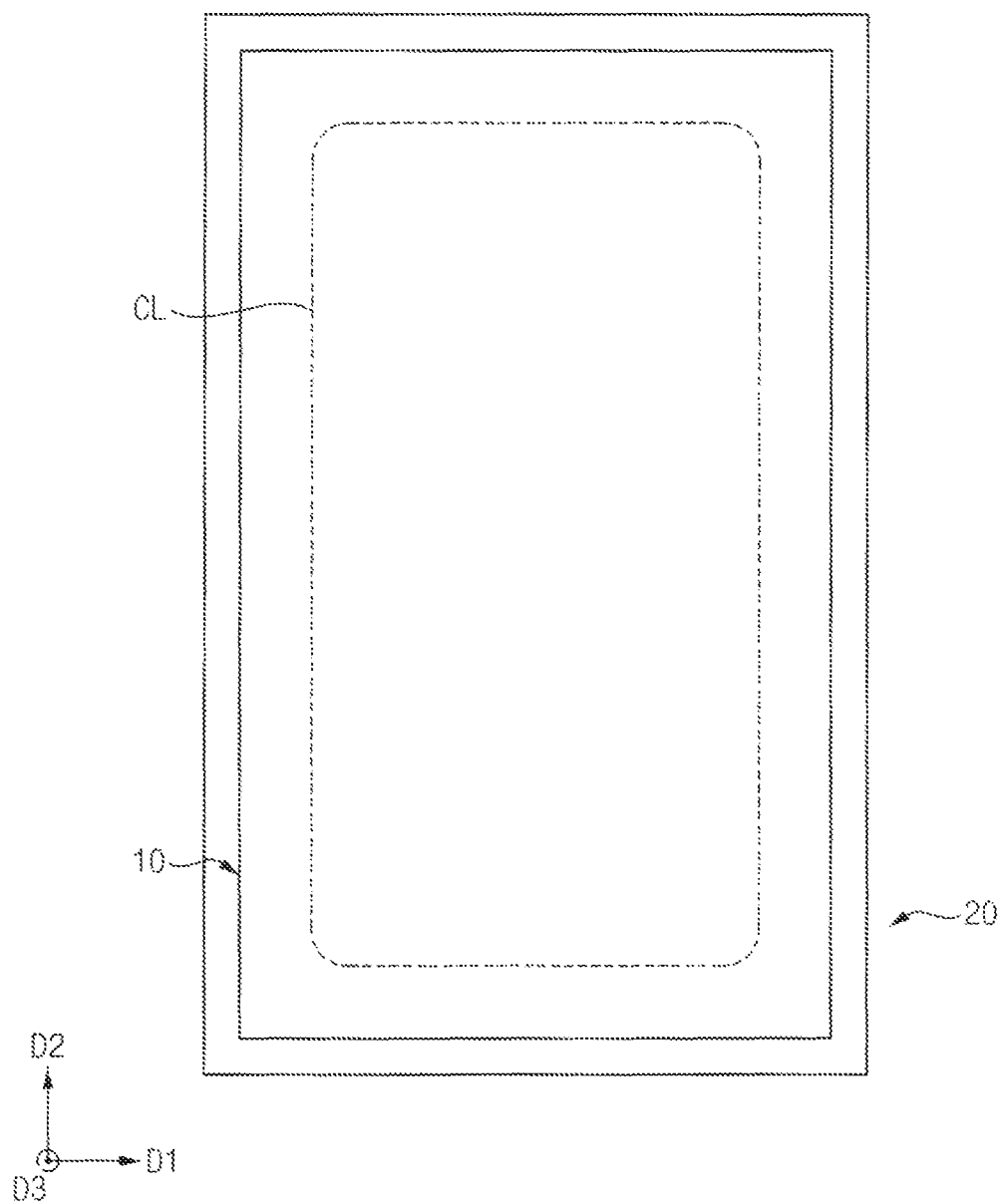
Figure 13:
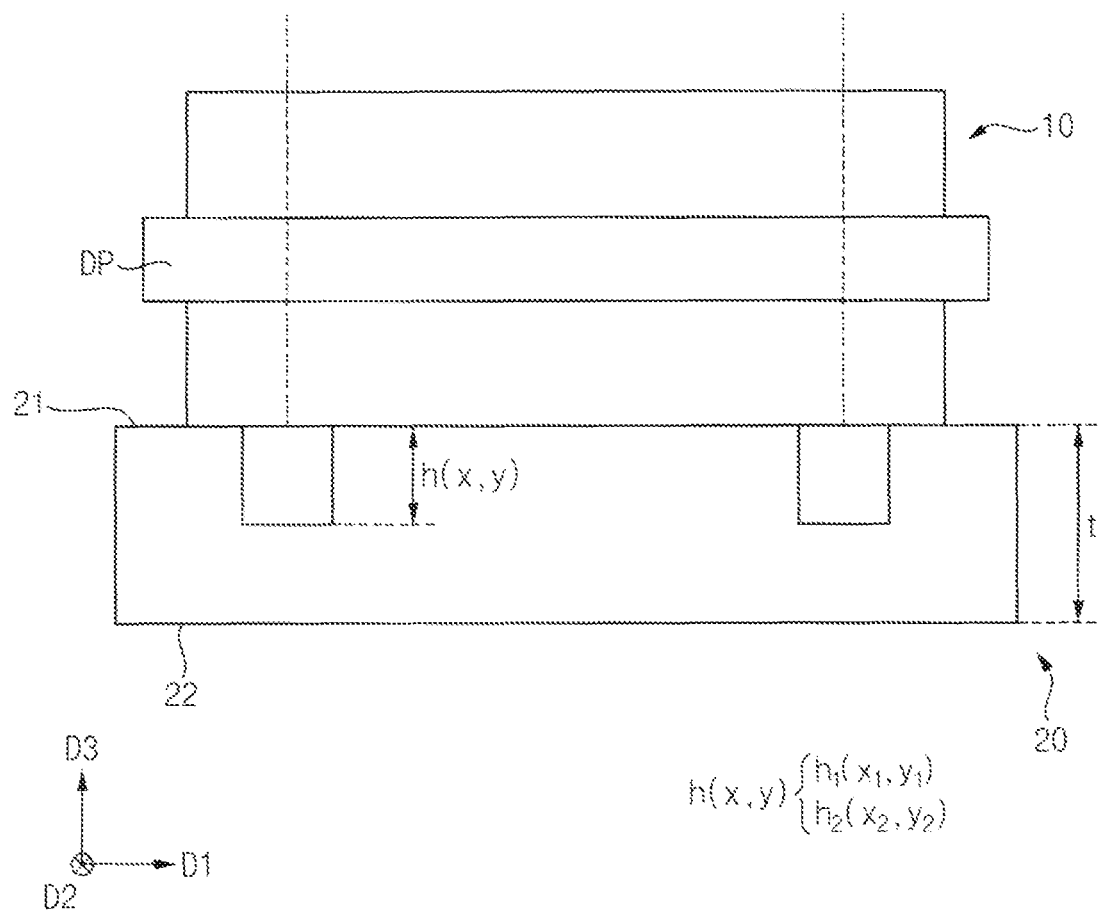

Referring to FIGS. 1, 12, and 13, FIG. 12 is a plan view showing a state in which the metal plate of FIG. 9 is laminated to the display module of FIG. 5, and FIG. 13 is a cross-sectional view showing the display module of FIG. 12 and the metal plate of FIG. 12, for example.

The laminator 200 may laminate the metal plate (e.g., the etched metal plate 20 of FIG. 9) to the display module 10. In an embodiment, the laminator 200 may include a bonding roller (not shown), and may laminate the metal plate to the display module 10 through the bonding roller (not shown), for example. Accordingly, the display module 10 may be disposed on the one surface 21 of the metal plate 20.

The cutter 300 may define a cutting line CL corresponding to the etching line EL. In an embodiment, the cutter 300 may include a laser irradiator 310 and a controller (not shown) which controls the laser irradiator 310, and may define the cutting line CL corresponding to the etching line EL according to a value preset in the controller (not shown), for example.

A position in which the cutting line CL is defined may be on the one surface 21 of the metal plate 20. However, the disclosure is not limited thereto. In an embodiment, the position in which the cutting line CL is defined may be under the opposite surface 22 of the metal plate 20, for example.

Figure 14:
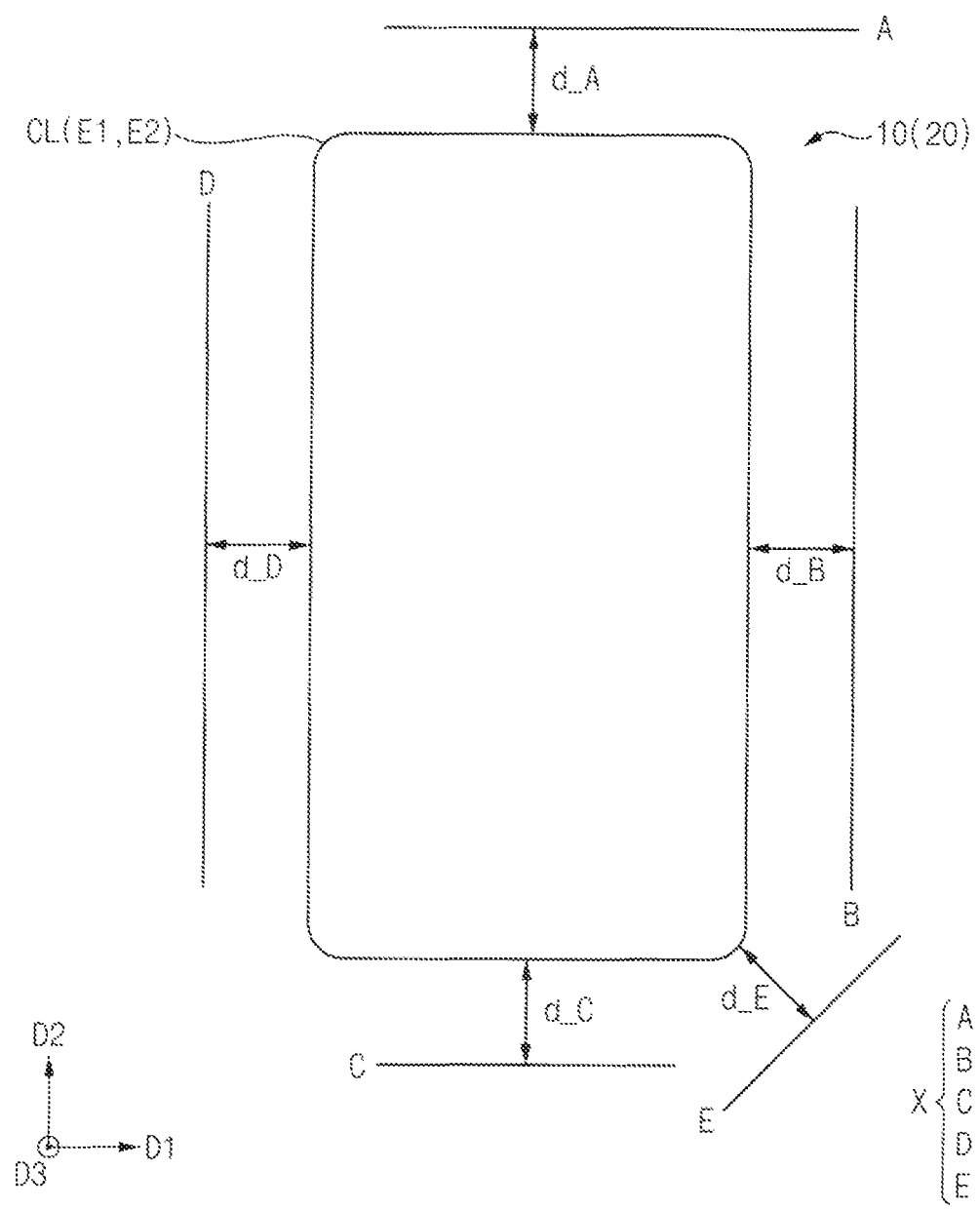
Figure 15:
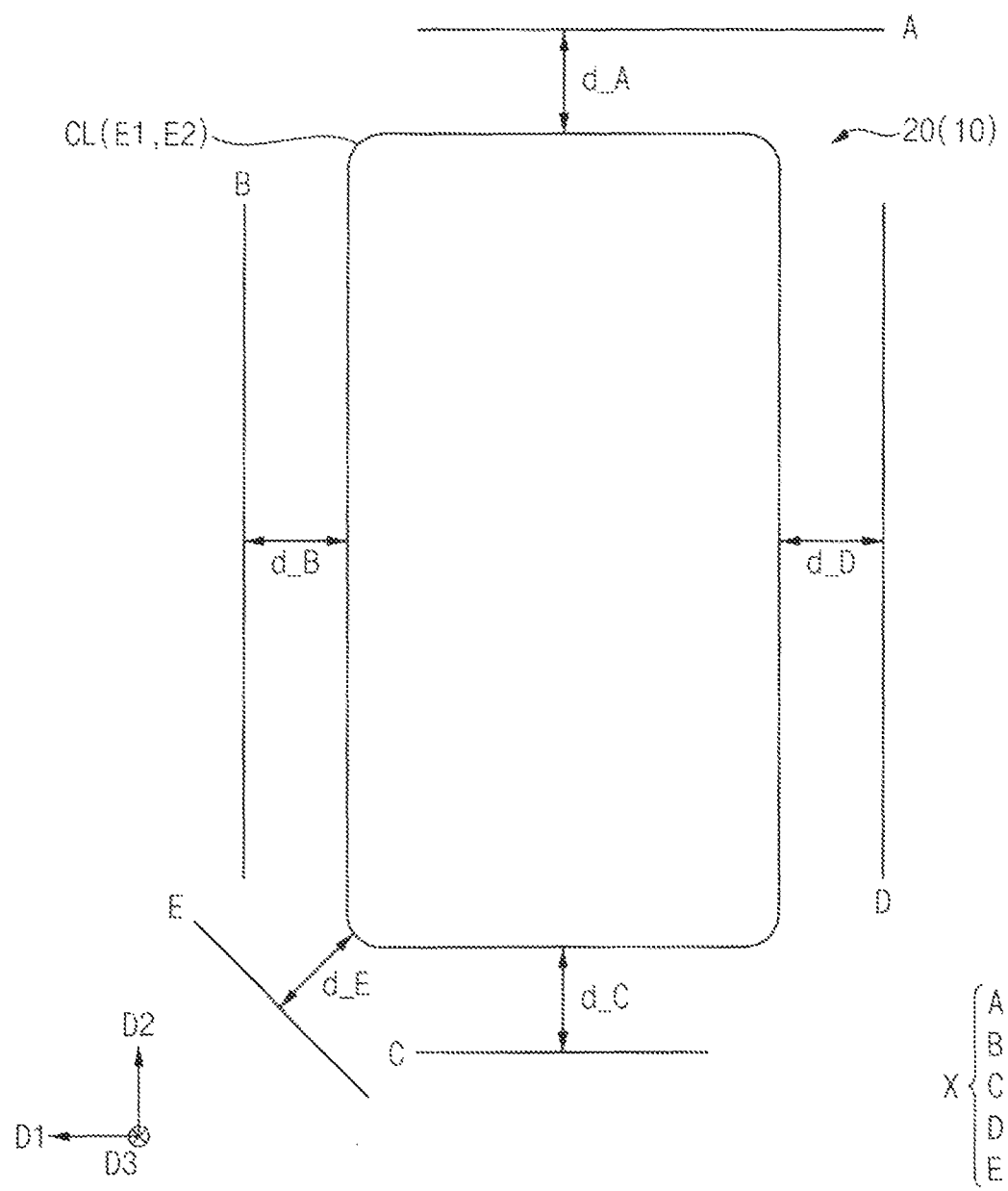
Figure 16:
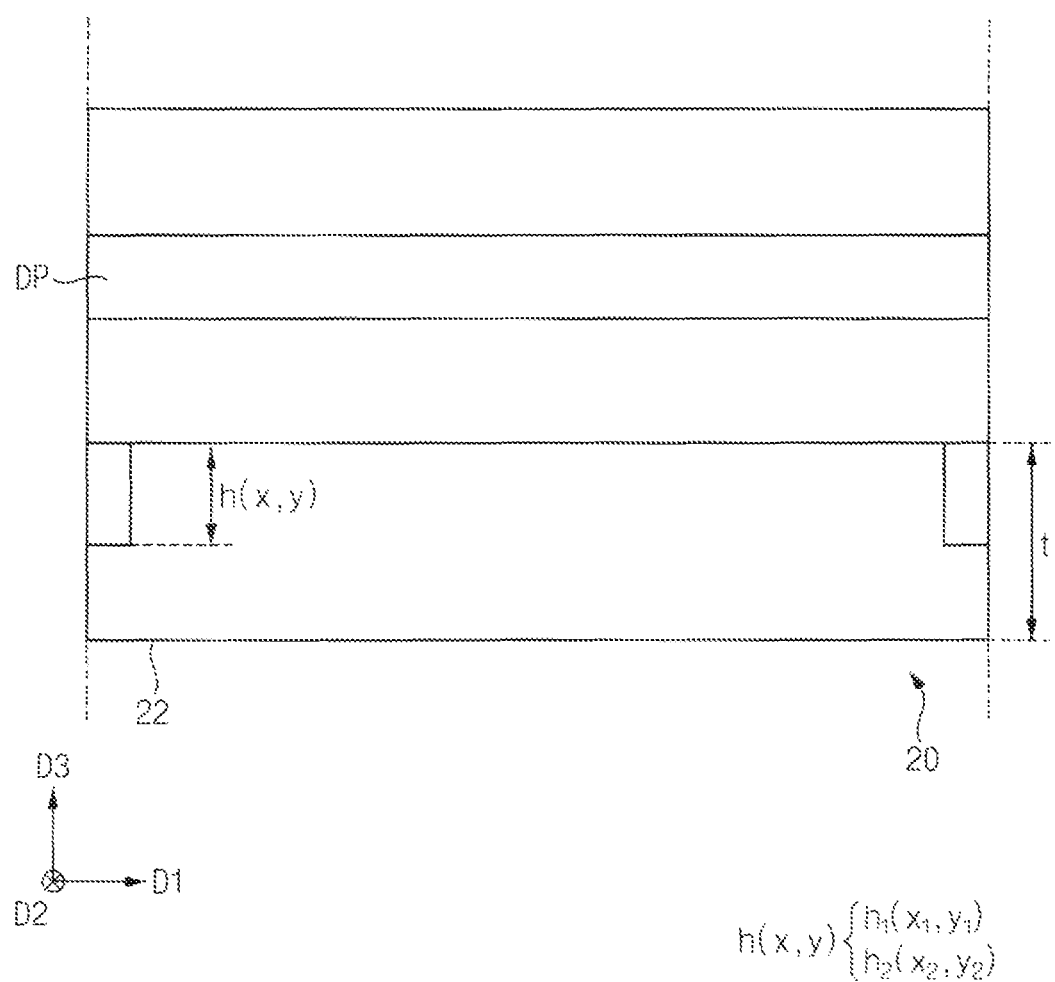

Referring to FIGS. 1 and 14 to 16, FIG. 14 is a plan view showing a state in which the display module of FIG. 12 and the metal plate of FIG. 12 are cut together with each other, FIG. 15 is a bottom view showing the display module of FIG. 14 and the metal plate of FIG. 14, and FIG. 16 is a front view showing the display module of FIG. 14 and the metal plate of FIG. 14, for example.

The cutter 300 may cut each of the display module 10 and the metal plate 20. In an embodiment, the cutter 300 may include a laser irradiator 310 and a controller (not shown) which controls the laser irradiator 310, and may cut each of the display module 10 and the metal plate 20 under a control of the controller (not shown), for example.

In addition, since the display module 10 and the metal plate 20 are aligned in a plan view, the cutter 300 may cut the display module 10 and the metal plate 20 laminated to the display module 10 together with each other along the cutting line CL. In this case, since the display module 10 and the metal plate 20 have been in a pre-aligned state in the plan view, a first edge part E1, which is an edge part of the cut display module 10, and a second edge part E2, which is an edge part of the cut metal plate 20, may be aligned in the plan view.

For all virtual planes X that are perpendicular to the plane, a shortest distance from the virtual plane X to the first edge part E1 and a shortest distance from the virtual plane X to the second edge part E2 may be substantially equal to each other.

In an embodiment, as shown in FIG. 14, for a virtual plane A that is perpendicular to the plane, a shortest distance from the A to the first edge part E1 and a shortest distance from the A to the second edge part E2 may have substantially the same value d_A, for example.

In an embodiment, as shown in FIG. 14, for a virtual plane B that is perpendicular to the plane, a shortest distance from the B to the first edge part E1 and a shortest distance from the B to the second edge part E2 may have substantially the same value d_B, for example.

In an embodiment, as shown in FIG. 14, for a virtual plane C that is perpendicular to the plane, a shortest distance from the C to the first edge part E1 and a shortest distance from the C to the second edge part E2 may have substantially the same value d_C, for example.

In an embodiment, as shown in FIG. 14, for a virtual plane D that is perpendicular to the plane, a shortest distance from the D to the first edge part E1 and a shortest distance from the D to the second edge part E2 may have substantially the same value d_D, for example.

In an embodiment, as shown in FIG. 14, for a virtual plane E that is perpendicular to the plane, a shortest distance from the E to the first edge part E1 and a shortest distance from the E to the second edge part E2 may have substantially the same value d_E, for example.

In other words, when the display module 10 and the metal plate 20 laminated to the display module 10 are cut together with each other along the cutting line CL, a laminating tolerance of the display module 10 may be reduced, and a laminating tolerance between the display module 10 and the metal plate 20 may also be reduced.

In an embodiment, when the display module 10 and the metal plate 20 laminated to the display module 10 are cut together with each other along the cutting line CL, a first viewing direction in which the metal plate 20 covers an entirety of the display module 10 and a second viewing direction in which the display module 10 covers an entirety of the metal plate 20 may respectively exist. In an embodiment, as shown in FIG. 15, the first viewing direction in which the metal plate 20 covers an entirety of the display module 10 may be a third direction (e.g., a third direction D3 that is perpendicular to each of the first and second directions D1 and D2), for example. In an embodiment, as shown in FIG. 14, the second viewing direction in which the display module 10 covers an entirety of the metal plate 20 may be a direction that is opposite to the third direction D3, for example. In other words, when the display module 10 and the metal plate 20 laminated to the display module 10 are cut together with each other along the cutting line CL, a planar area size of the display module 10 and a planar area size of the metal plate 20 may be equal to each other.

In an embodiment, the cutting line CL may have a shape congruent with the closed curve. As described above with reference to FIGS. 9 to 11, for all the points (x, y) of the etching line EL, the depths h(x, y) by which the etching is performed along the etching line EL may be at least half of the thickness t of the metal plate 20 before the etching. Since the cutting line CL may have the shape congruent with the closed curve, the metal plate 20 may be easily cut along the cutting line CL.

Hereinafter, an embodiment of performing a method of manufacturing the display device 1 by the manufacturing apparatus 1000 for the display device 1 described with reference to FIGS. 1 and 2 will be described, but the disclosure is not limited thereto.

In an embodiment, a method of manufacturing a display device 1 may include defining an etching line EL having a shape of a closed curve on a metal plate 20 having a higher rigidity than a rigidity of a display panel DP, etching the metal plate 20 along the etching line EL, laminating the etched metal plate 20 to a display module 10 including the display panel DP, defining a cutting line CL corresponding to the etching line EL, cutting the display module 10 and the metal plate 20 laminated to the display module 10 together with each other along the cutting line CL, and accommodating each of the cut display module 10 and the cut metal plate 20.

First, the etching line EL having the shape of the closed curve may be defined on the metal plate 20 having the higher rigidity than the display panel DP. In an embodiment, as shown in FIG. 7, the etching line EL having the shape of the closed curve may be defined on the metal plate 20 having the higher rigidity than the display panel DP, for example.

Next, the metal plate 20 may be etched along the etching line EL. In an embodiment, as shown in FIG. 9, the metal plate 20 may be etched along the etching line EL, for example.

Next, the etched metal plate 20 may be laminated to the display module 10 including the display panel DP. In an embodiment, as shown in FIG. 12, the etched metal plate 20 may be laminated to the display module 10 including the display panel DP, for example.

Next, the cutting line CL corresponding to the etching line EL may be defined. In an embodiment, as may be understood by comparing FIGS. 9 and 12 with each other, the cutting line CL corresponding to the etching line EL may be defined, for example.

Next, the display module 10 and the metal plate 20 laminated to the display module 10 may be cut together with each other along the cutting line CL. In an embodiment, as being understood by comparing FIGS. 12 and 14 with each other, the display module 10 and the metal plate 20 laminated to the display module 10 may be cut together with each other along the cutting line CL, for example.

As described with reference to FIGS. 14 and 15, for all the virtual planes X that are perpendicular to the plane, the shortest distance from the virtual plane X to the first edge part E1 and the shortest distance from the virtual plane X to the second edge part E2 may be substantially equal to each other.

In other words, when the display module 10 and the metal plate 20 laminated to the display module 10 are cut together with each other along the cutting line CL, a laminating tolerance of the display module 10 may be reduced, and a laminating tolerance between the display module 10 and the metal plate 20 may also be reduced.

Figure 17:
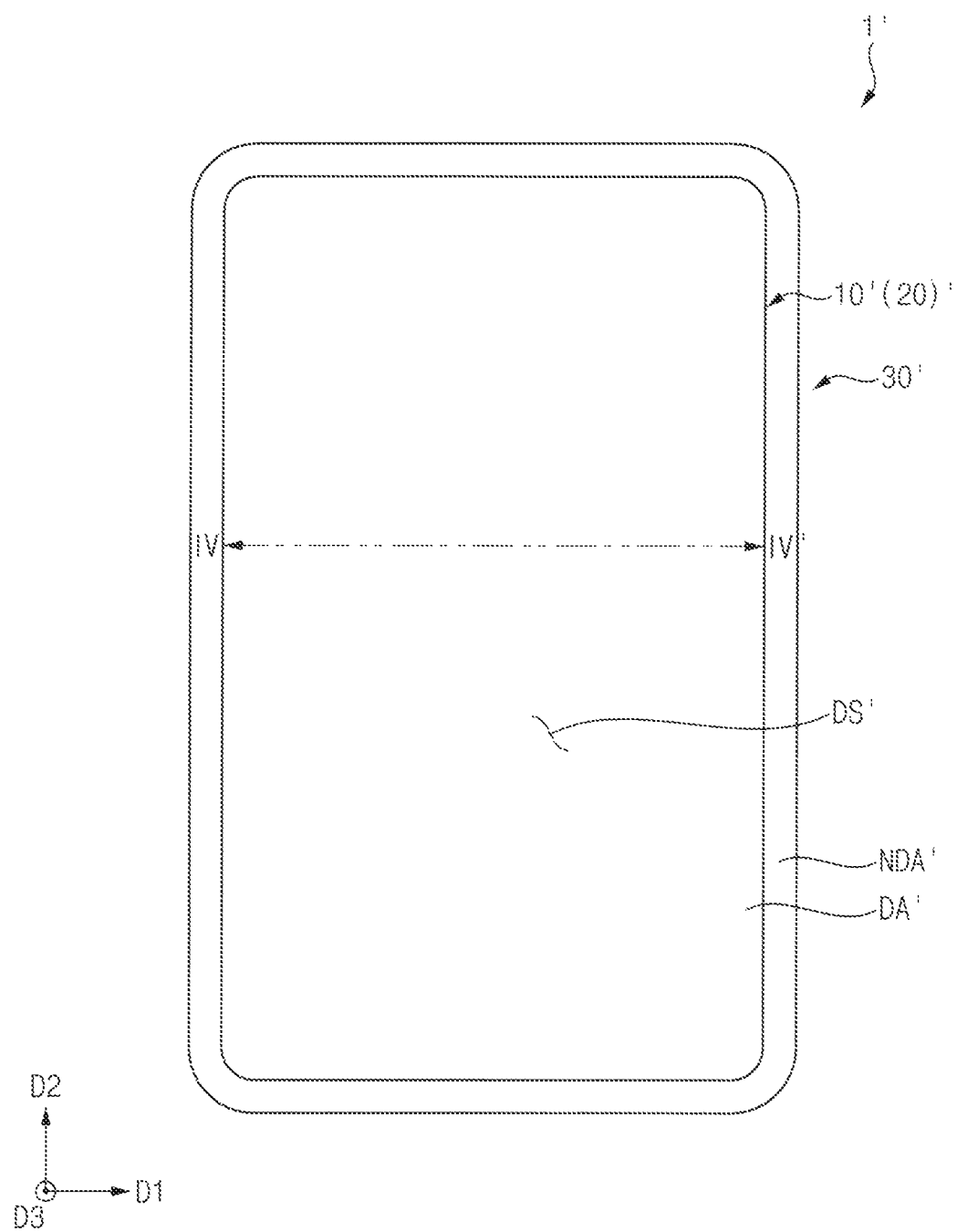
FIG. 17 is a plan view showing another embodiment of a display device manufactured by the manufacturing apparatus of FIG. 1.

FIG. 17 is a plan view showing another embodiment of a display device manufactured by the manufacturing apparatus of FIG. 1.

Referring to FIGS. 1 and 17, the manufacturing apparatus 1000 described with reference to FIG. 1 may manufacture a display device 1'.

Figure 18:
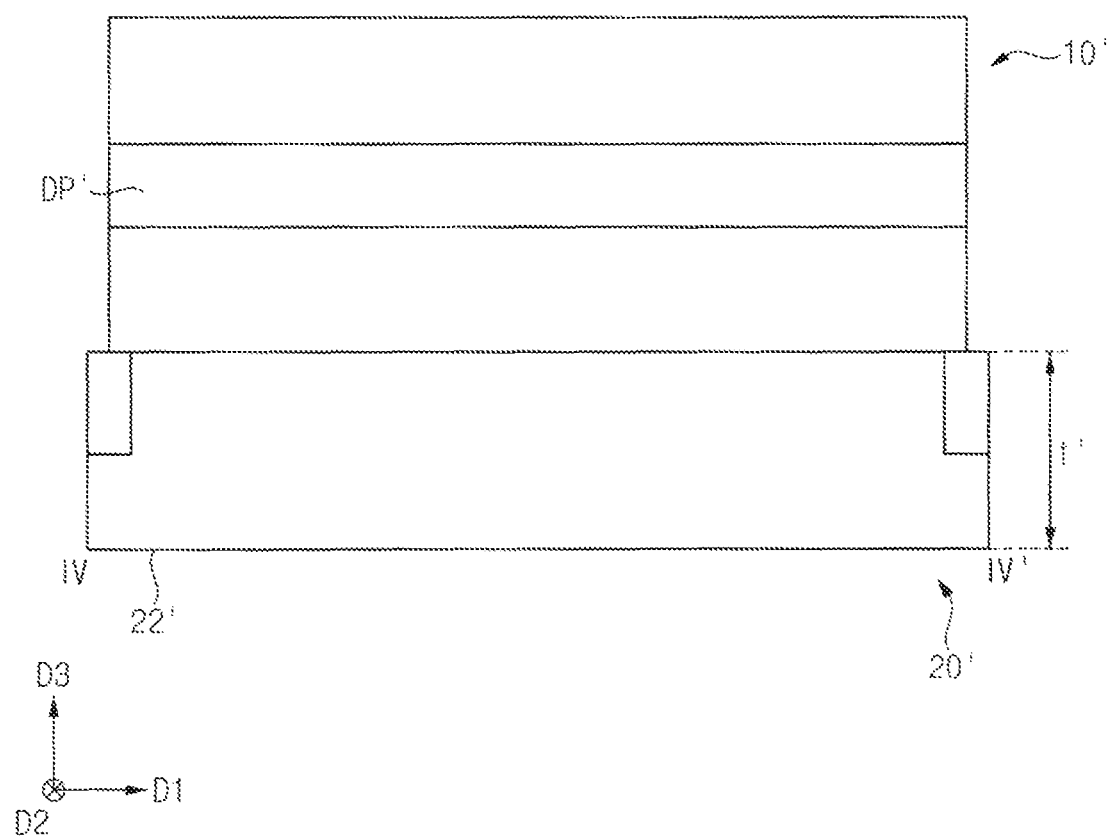
FIG. 18 is a cross-sectional view taken along line IV-IV' of FIG. 17.

FIG. 18 is a cross-sectional view taken along line IV-IV' of FIG. 17.

Referring to FIGS. 17 and 18, the display device 1' may include a display module 10' including a display panel DP', a metal plate 20' having greater rigidity than the display panel DP', and a case 30' for accommodating each of the display module 10' and the metal plate 20'. However, it will be noted that FIG. 18 only shows the manufactured display device 1'. In an embodiment, since FIG. 18 shows the manufactured display device 1', the metal plate 20' shown in FIG. 18 may be a metal plate cut along a first cutting line (e.g., a first cutting line CL1 of FIG. 23), and the display module 10' shown in FIG. 18 may be a display module cut along a second cutting line (e.g., a second cutting line CL2 of FIG. 23), for example.

Hereinafter, redundant descriptions of the display module 10', the metal plate 20', the display surface DS', the display area DA' and the non-display area NDA' desired for manufacturing the display device 1' will be omitted.

FIGS. 19 to 26 are views for describing a method of manufacturing the display device of FIG. 17.

Figure 19:
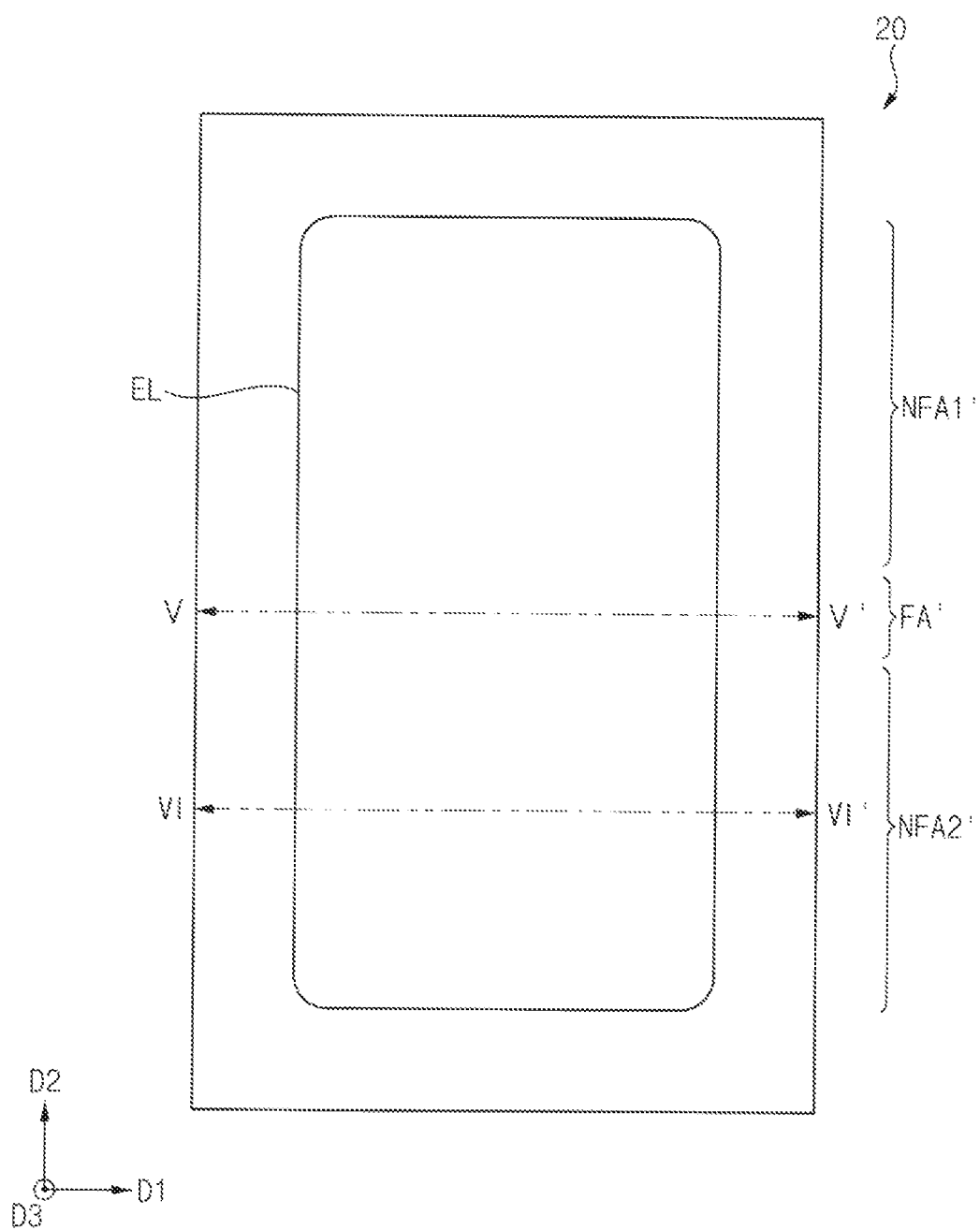
FIGS. 19 to 26 are views for describing a method of manufacturing the display device of FIG. 17.
Figure 20:
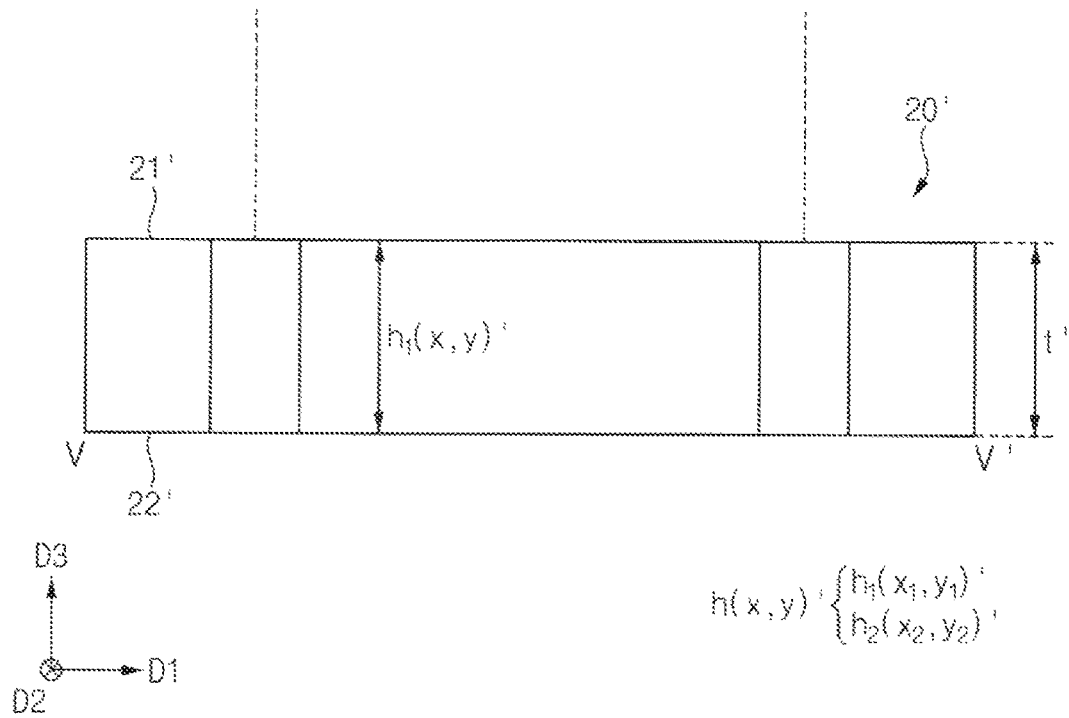
Figure 21:
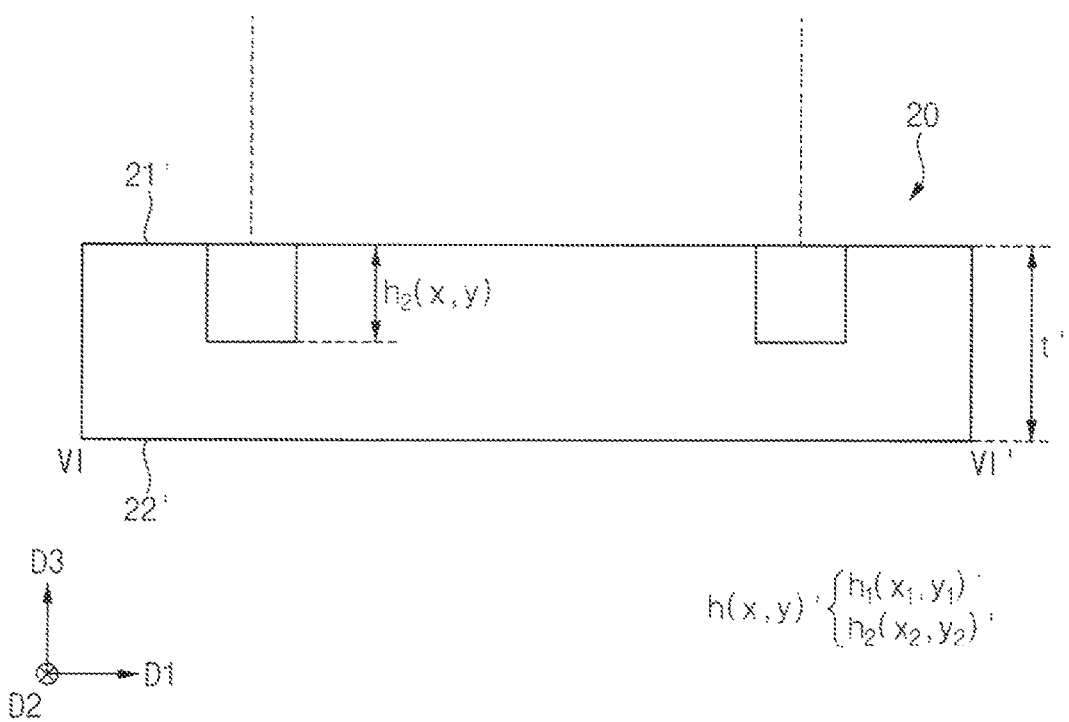

Referring to FIGS. 1, 17, and 19 to 21, FIG. 19 is a plan view showing a state in which etching is performed along an etching line defined on the metal plate of FIG. 18, FIG. 20 is a cross-sectional view taken along line V-V' of FIG. 19, and FIG. 21 is a cross-sectional view taken along line VI-VI' of FIG. 19, for example.

The etcher 100 may etch the metal plate 20' along the etching line EL'. In an embodiment, the etcher 100 may etch along the etching line EL', for example. In other words, the etching line EL' may have a shape of a closed curve, and the metal plate 20' may be etched in the shape of the closed curve.

For all points (x, y) of the etching line EL', depths h(x, y)' by which the etching is performed along the etching line EL' may be at least half of a thickness t' of the metal plate 20' before the etching. In this case, each of the depths h(x, y)' by which the etching is performed along the etching line EL' may be a function of x, which is a position in the first direction D1, and y, which is a position in the second direction D2. The depths h(x, y)' and the thickness t' may satisfy Mathematical formula 4 below.

$$h(x, y)' \geq \frac{1}{2} t' \qquad \text{<Mathematical formula 4>}$$

As described above, for all the points (x, y) of the etching line EL', the depths h(x, y)' by which the etching is performed along the etching line EL' may be at least half of the thickness t' of the metal plate 20' before the etching. In other words, the metal plate 20' may be etched by at least half of the thickness t' of the metal plate 20'. Accordingly, the metal plate 20' corresponding to the etching line EL' may be easily cut along a first cutting line (e.g., a first cutting line CL1 of FIG. 22).

In an embodiment, the metal plate 20' may include a folding part FA' and non-folding parts NFA1' and NFA2' that are adjacent to the folding part FA', and each of first depths $h_1(x_1, y_1)'$ by which the etching is performed at all points $(x_1, y_1)$ where the etching line EL' is common to the folding part FA' may be greater than each of second depths $h_2(x_2, y_2)'$ by which the etching is performed at all points $(x_2, y_2)$ where the etching line EL' is common to the non-folding parts NFA1' and NFA2'. In this case, the depths h(x, y)' by which the etching is performed along the etching line EL' may include the first depths $h_1(x_1, y_1)'$ and the second depths $h_2(x_2, y_2)'$. Each of the first depths $h_1(x_1, y_1)'$ may be a function of $x_1$, which is a position in the first direction D1, and $y_1$, which is a position in the second direction D2, and each of the second depths $h_2(x_2, y_2)'$ may be a function of $x_2$, which is a position in the first direction D1, and $y_2$, which is a position in the second direction D2. The first depths $h_1(x_1, y_1)'$ and the second depths $h_2(x_2, y_2)'$ may satisfy Mathematical formula 5 below.

$$h_1(x_1, y_1)' > h_2(x_2, y_2)' \qquad \text{<Mathematical formula 5>}$$

As described above, in an embodiment, each of the first depths $h_1(x_1, y_1)'$ may be greater than each of the second depths $h_2(x_2, y_2)'$. In other words, the metal plate 20' may be etched deeper in the folding part FA' than in the non-folding parts NFA1' and NFA2'. That is, a first depth (e.g., the first depths $h_1(x_1, y_1)'$) by which the folding part FA' is etched may be greater than a second depth (e.g., the second depths $h_2(x_2, y_2)'$) by which the non-folding parts NFA1' and NFA2' are etched. Accordingly, the display device 1' described with reference to FIG. 17 may be easily folded.

In an embodiment, each of the first depths $h_1(x_1, y_1)'$ may be equal to the thickness t' of the metal plate 20' before the etching. In other words, at all the points $(x_1, y_1)$ where the etching line EL' is common to the folding part FA', the metal plate 20' may be penetrated by the etching. Accordingly, deformation occurring in the display module 10' and the metal plate 20' in a cutting process may be reduced. The first depths $h_1(x_1, y_1)'$ and the thickness t' may satisfy Mathematical formula 6 below.

$$h_1(x_1, y_1)' = t \qquad \text{<Mathematical formula 6>}$$

Figure 22:
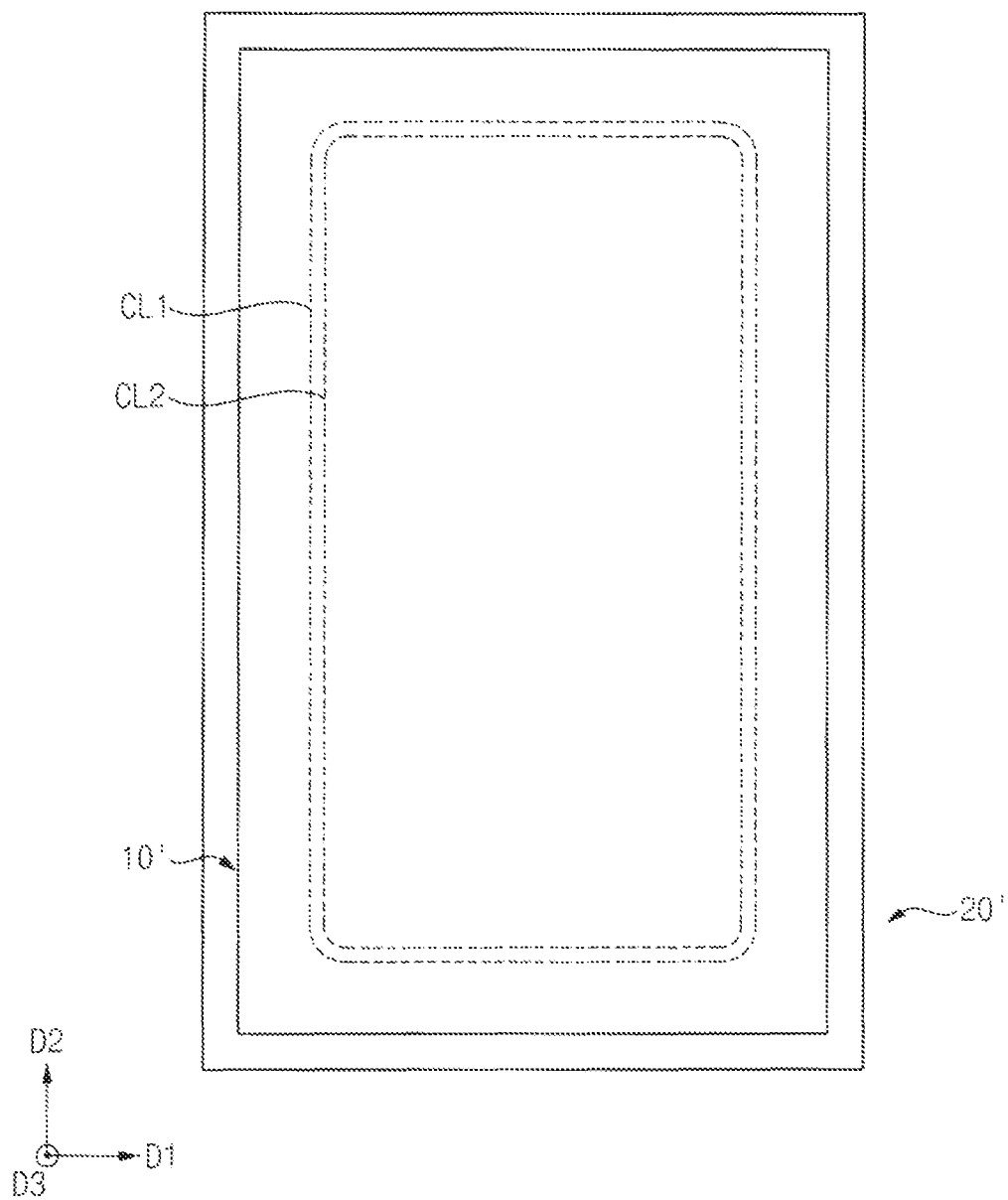

Referring to FIGS. 1, 17, and 22, FIG. 22 is a plan view showing a state in which the metal plate of FIG. 19 is laminated to the display module of FIG. 5, for example.

The laminator 200 may laminate a metal plate (e.g., the etched plate 20' of FIG. 19) to the display module 10'. In an embodiment, the laminator 200 may include a bonding roller (not shown), and may laminate the metal plate to the display module 10' through the bonding roller (not shown), for example. Accordingly, the display module 10' and the metal plate may be aligned in a plan view (e.g., an opposite surface 22' of FIG. 20).

Figure 23:
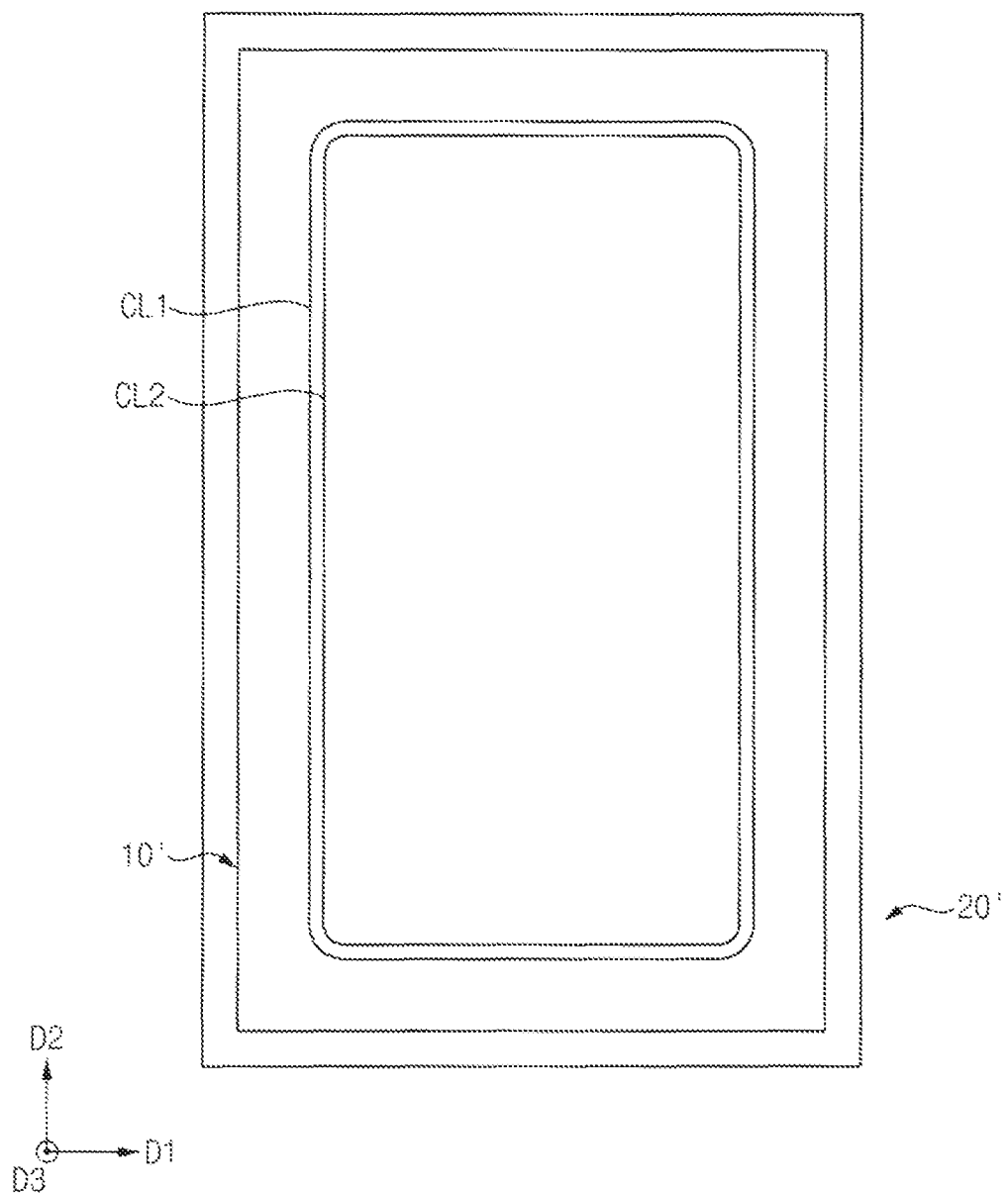
Figure 24:
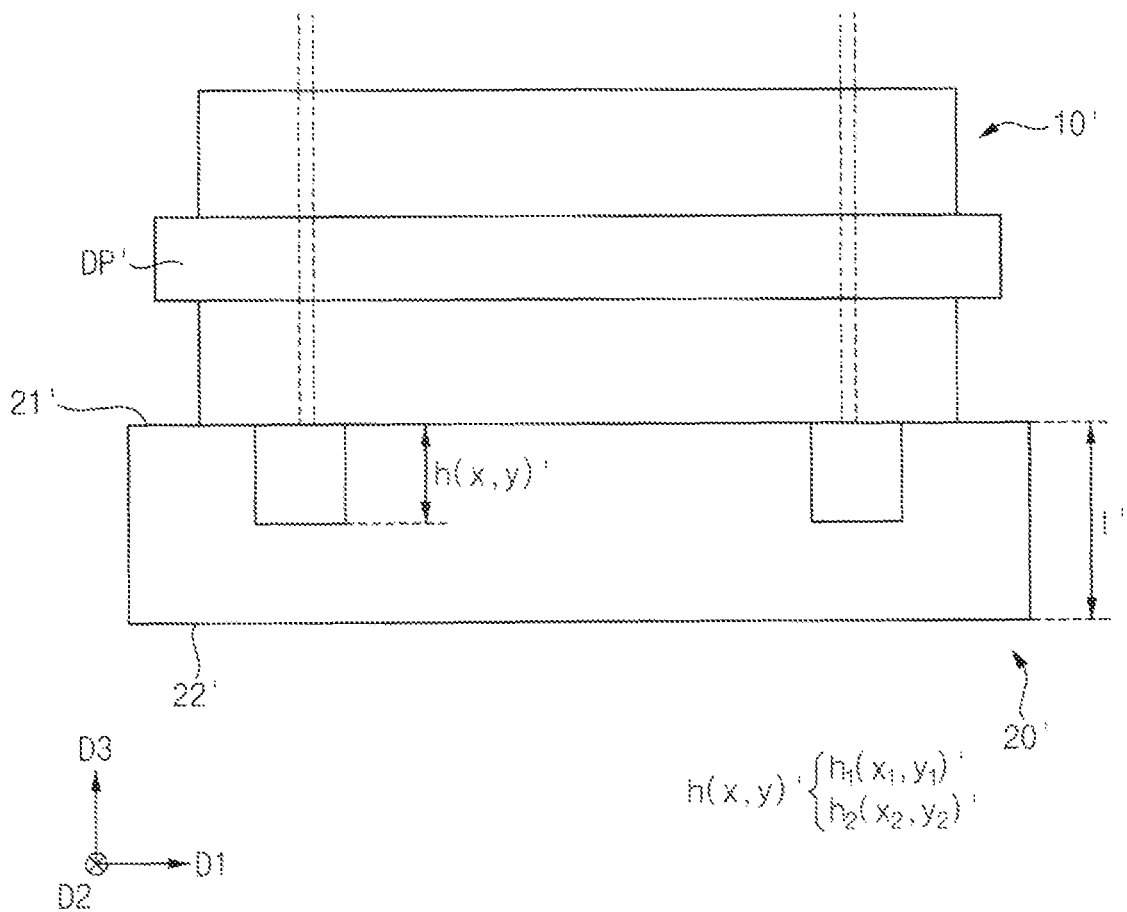
Figure 25:
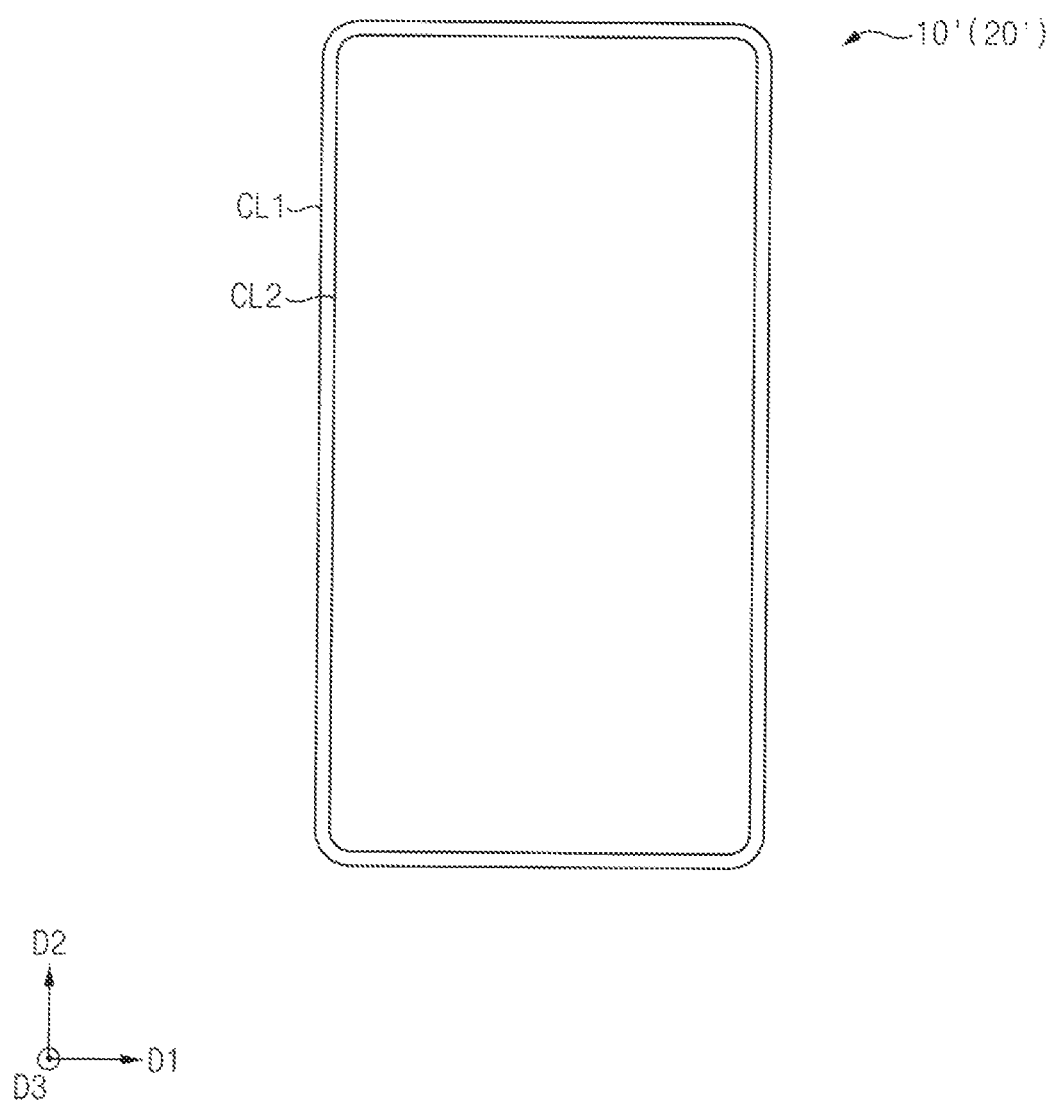
Figure 26:
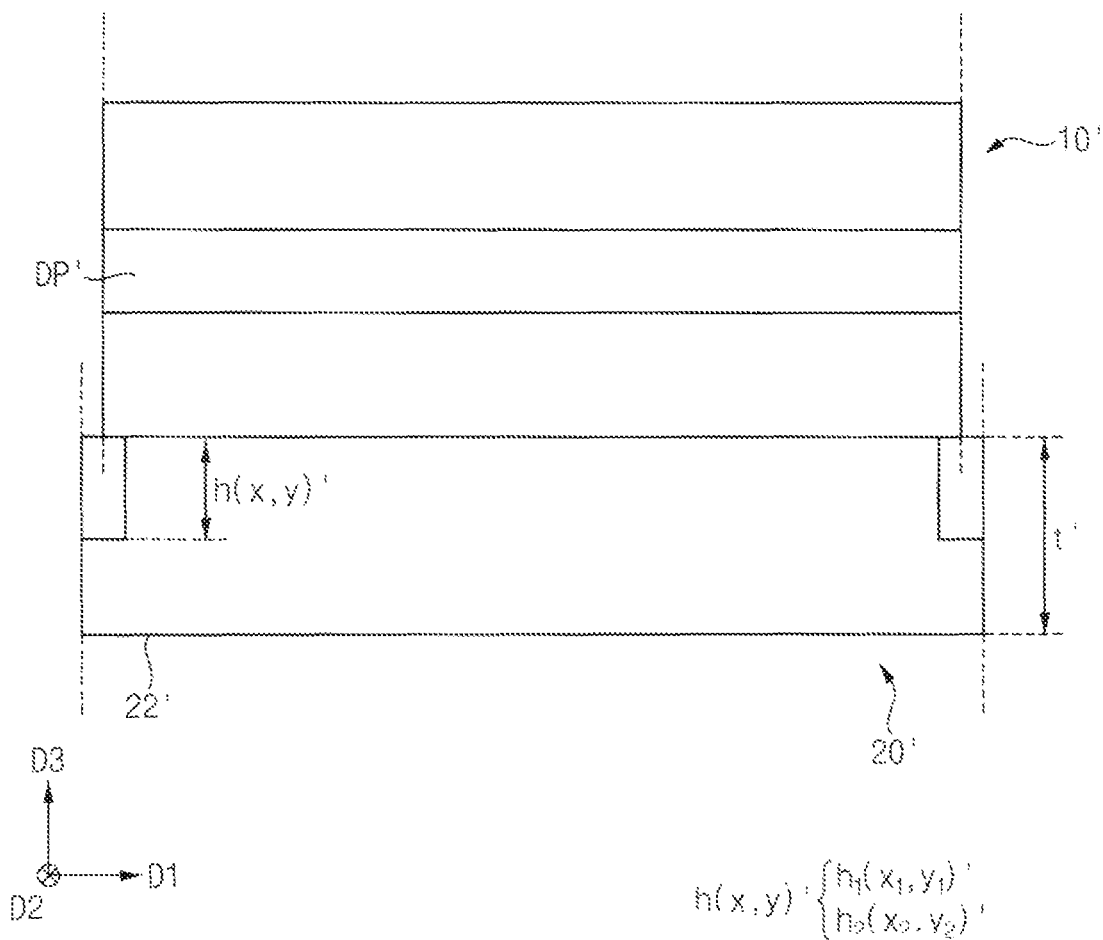

Referring to FIGS. 1, 17, and 23 to 26, FIG. 23 is a plan view showing a first cutting line defined in the metal plate of FIG. 22 and a second cutting line defined in the display module of FIG. 22, FIG. 24 is a cross-sectional view showing the display module of FIG. 23 and the metal plate of FIG. 23, FIG. 25 is a plan view showing a state in which the display module of FIG. 23 and the metal plate of FIG. 23 are cut, and FIG. 26 is a cross-sectional view showing the display module of FIG. 25 and the metal plate of FIG. 25, for example.

The cutter 300 may define a first cutting line CL1 corresponding to the etching line EL' and a second cutting line CL2 that is different from the first cutting line CL1. In an embodiment, the cutter 300 may include a laser irradiator 310 and a controller (not shown) which controls the laser irradiator 310, and may define the first cutting line CL1 and the second cutting line CL2 according to a value preset in the controller (not shown), for example.

A position in which the first cutting line CL1 and the second cutting line CL2 are defined may be on one surface 21' of the metal plate 20'. However, the disclosure is not limited thereto. In an embodiment, the position in which the first cutting line CL1 and the second cutting line CL2 are defined may be under an opposite surface of the metal plate 20' (e.g., the opposite surface 22' of FIG. 20), for example.

The cutter 300 may cut each of the display module 10' and the metal plate 20'. In an embodiment, the cutter 300 may include a laser irradiator 310 and a controller (not shown) which controls the laser irradiator 310, and may cut each of the display module 10' and the metal plate 20' under a control of the controller (not shown), for example.

In an embodiment, the cutter 300 may first cut only the laminated metal plate 20' among the display module 10' and the metal plate 20' laminated to the display module 10' along the first cutting line CL1, and may cut only the display module 10' among the display module 10' and the metal plate 20' laminated to the display module 10' along the second cutting line CL2. In other words, the cutter 300 may perform a cutting operation twice to cut each of the display module 10' and the metal plate 20' laminated to the display module 10'.

In another embodiment, the cutter 300 may first cut only the display module 10' among the display module 10' and the metal plate 20' laminated to the display module 10' along the second cutting line CL2, and may cut only the laminated metal plate 20' among the display module 10' and the metal plate 20' laminated to the display module 10' along the first cutting line CL1. In other words, the cutter 300 may perform a cutting operation twice to cut each of the display module 10' and the metal plate 20' laminated to the display module 10'.

When the display module 10' is cut along the second cutting line CL2, a laminating tolerance of the display module 10' may be reduced.

As described above, the etching line EL' may have the shape of the closed curve, and the metal plate 20' may be etched in the shape of the closed curve.

In an embodiment, the closed curve of the etching line EL' may be a rectangle having a rounded vertex.

In an embodiment, the first cutting line CL1 may have a shape congruent with the closed curve. As described above, for all the points (x, y) of the etching line EL', the depths h(x, y)' by which the etching is performed along the etching line EL' may be at least half of the thickness t' of the metal plate 20' before the etching. Since the first cutting line CL1 may have the shape congruent with the closed curve, the metal plate 20' may be easily cut along the first cutting line CL1. In this case, for all virtual planes X that are perpendicular to the plane, a shortest distance from the virtual plane X to the first edge part and a shortest distance from the virtual plane X to the second edge part may be equal to each other. However, since the above configuration has been described above, detailed descriptions thereof will be omitted.

In an embodiment, the second cutting line CL2 may have a shape resembling the closed curve. In an embodiment, as shown in FIG. 25, when viewed from a top of the display module 10', the display module 10' may cover only a portion of the metal plate 20', for example. Accordingly, when each of the cut display module 10' and the cut metal plate 20' is accommodated in the case 30', the display module 10' may be protected from an external impact.

As described above, although the method of manufacturing the display device and the manufacturing apparatus for the display device in the embodiments of the disclosure have been described with reference to the drawings, the above description is provided for illustrative purposes, and changes and modifications may be made by those of ordinary skill in the art without departing from the technical idea of the disclosure.

What is claimed is:

1. A method of manufacturing a display device, the method comprising:
    defining an etching line having a shape of a closed curve on a metal plate having a rigidity higher than a rigidity of a display panel;
    etching the metal plate along the etching line;
    laminating the etched metal plate to a display module including the display panel;
    defining a cutting line corresponding to the etching line; and
    cutting the display module and the metal plate laminated to the display module together with each other along the cutting line.

2. The method of claim 1, wherein the metal plate is etched by at least half of a thickness of the metal plate.

3. The method of claim 1, wherein the metal plate includes a folding part and a non-folding part which is adjacent to the folding part, and
    a first depth by which the folding part is etched is greater than a second depth by which the non-folding part is etched.

4. The method of claim 1, wherein the closed curve includes a rectangle having a rounded vertex.

5. The method of claim 1, wherein the cutting line has a shape congruent with the closed curve.

6. The method of claim 1, wherein a first edge part, which is an edge part of the cut display module, and a second edge part, which is an edge part of the cut metal plate, are aligned to match each other in a plan view.

7. The method of claim 6, wherein, for all of virtual planes which are perpendicular to a plane defined by the plan view, a shortest distance from a virtual plane of the virtual planes to the first edge part and a shortest distance from the virtual plane to the second edge part are equal to each other.

8. The method of claim 6, wherein, when the display module and the metal plate laminated to the display module are cut together with each other along the cutting line, a planar area size the display module and a planar area size the metal plate are equal to each other.

9. The method of claim 1, wherein the metal plate includes stainless steel.

10. The method of claim 1, further comprising accommodating each of the cut display module and the cut metal plate.

11. A method of manufacturing a display device, the method comprising:
    defining an etching line having a shape of a closed curve on a metal plate having a rigidity higher than a rigidity of a display panel;
    etching the metal plate along the etching line;
    laminating the etched metal plate to a display module including the display panel;
    defining a first cutting line corresponding to the etching line and a second cutting line which is different from the first cutting line; and
    cutting only the laminated metal plate among the display module and the metal plate laminated to the display module along the first cutting line.

12. The method of claim 11, wherein the metal plate is etched by at least half of a thickness of the metal plate.

13. The method of claim 11, wherein the metal plate includes a folding part and a non-folding part which is adjacent to the folding part, and
    a first depth by which the folding part is etched is greater than a second depth by which the non-folding part is etched.

14. The method of claim 11, wherein the closed curve includes a rectangle having a rounded vertex.

15. The method of claim 11, wherein the first cutting line has a shape congruent with the closed curve.

16. The method of claim 15, wherein the second cutting line has a shape resembling the closed curve.

17. The method of claim 16, wherein, before the cutting only the laminated metal plate, the method further comprises cutting only the display module among the display module and the metal plate laminated to the display module along the second cutting line.

18. The method of claim 16, wherein, after the cutting only the laminated metal plate, the method further comprises cutting only the display module among the display module and the metal plate laminated to the display module along the second cutting line.

19. The method of claim 11, wherein a first edge part, which is an edge part of the cut display module, and a second edge part, which is an edge part of the cut metal plate, are aligned to match each other in a plan view.

20. The method of claim 19, wherein, for all of virtual planes which are perpendicular to a plane defined by the plan view, a shortest distance from a virtual plane of the all of virtual planes to the first edge part and a shortest distance from the virtual plane to the second edge part are equal to each other.

* * * * *